US012795640B2

(12) United States Patent
Verma et al.

(10) Patent No.: US 12,795,640 B2
(45) Date of Patent: Nov. 10, 2026

(54) SYNCHRONIZATION/COORDINATION/CONTROL LINK OR CHANNEL SYSTEM OR METHOD

(71) Applicant: Avago Technologies International Sales Pte. Limited, Singapore (SG)

(72) Inventors: Sindhu Verma, Bangalore (IN); Shubhodeep Adhikari, Bangalore (IN); Matthew J Fischer, Mountain View, CA (US); Vinko Erceg, Carlsbad, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 422 days.

(21) Appl. No.: 18/307,381

(22) Filed: Apr. 26, 2023

(65) Prior Publication Data

US 2024/0163862 A1 May 16, 2024

(30) Foreign Application Priority Data

Nov. 12, 2022 (IN) ............................ 202221064888

(51) Int. Cl.
*H04W 72/0453* (2023.01)
*H04W 72/12* (2023.01)
*H04W 74/0808* (2024.01)
*H04W 84/12* (2009.01)

(52) U.S. Cl.
CPC .................................. *H04W 72/12* (2013.01)

(58) Field of Classification Search
CPC ............ H04W 72/12; H04W 74/0808; H04W 72/0453; H04W 74/002; H04W 84/12; H04W 72/40; H04W 72/50; H04W 72/51; H04W 72/512
USPC ........................................................ 370/329
See application file for complete search history.

(56) References Cited

U.S. PATENT DOCUMENTS

2005/0226270 A1 10/2005 Liu et al.
2017/0142721 A1* 5/2017 Azizi .................... H04L 5/0064
2019/0158139 A1* 5/2019 Talarico ................ H04W 16/14
2020/0014576 A1* 1/2020 Cherian ................ H04L 1/0026
2020/0169977 A1* 5/2020 Agardh ................. H04W 16/14
2020/0245352 A1* 7/2020 Seok ..................... H04W 72/23
(Continued)

FOREIGN PATENT DOCUMENTS

WO WO-2021/080265 A1 4/2021
WO WO-2021/107685 A1 6/2021

OTHER PUBLICATIONS

IEEE P802.11be™/D2.2 Draft Standard for Information Technology—Telecommunications and information exchange between systems Local and metropolitan area networks—Specific requirements—Part 11: Wireless LAN Medium Access Control (MAC) and Physical Layer (PHY) Specifications—Amendment 8: Enhancements for extremely high throughput (EHT).
(Continued)

*Primary Examiner* — Ayman A Abaza
*Assistant Examiner* — Tracy L Williams
(74) *Attorney, Agent, or Firm* — Foley & Lardner LLP

(57) ABSTRACT

Some embodiments relate to a first device for communicating with a second device. The first device includes configured to communicate data to the second device using a resource. The resource has a bandwidth of less than a total bandwidth of a primary channel of a plurality of links, and the data is low latency data or control data.

19 Claims, 8 Drawing Sheets

(56) References Cited

U.S. PATENT DOCUMENTS

| | | | | |
|---|---|---|---|---|
| 2021/0160889 | A1* | 5/2021 | Yang | H04L 27/2602 |
| 2022/0191929 | A1* | 6/2022 | Aboul-Magd | H04W 74/0816 |
| 2022/0279602 | A1* | 9/2022 | Xue | H04L 65/40 |
| 2022/0418018 | A1* | 12/2022 | Jang | H04W 76/15 |
| 2023/0035113 | A1* | 2/2023 | Shellhammer | H04L 5/0041 |
| 2023/0354451 | A1* | 11/2023 | Jang | H04W 74/0816 |
| 2024/0292463 | A1* | 8/2024 | Kim | H04W 74/006 |

OTHER PUBLICATIONS

"IEEE Standard for Information Technology—Telecommunications and Information Exchange between Systems Local and Metropolitan Area Networks—Specific Requirements Part 11: Wireless LAN Medium Access Control (MAC) and Physical Layer (PHY) Specifications Amendment 1: Enhancements for High-Efficiency WL", IEEE Standard , IEEE , Piscataway, NJ USA, May 19, 2021 (May 19, 2021), pp. 1-767.

Deng Cailian et al: "IEEE 802 . 11be Wi-Fi 7: New Challenges and Opportunities", IEEE Communications Surveys & Tutorials , IEEE, USA, vol. 22, No. 4 , Jul. 29, 2020 (Jul. 29, 2020) , pp. 2136-2166.

European Search Report on EP 23209106.6 dated Mar. 11, 2024.

Evgeny Avdotin et al: "OFDMA Resource Allocation for Real-Time Applications in IEEE 802.llax Networks", arxiv.org, Cornell University Library, 201 Olin Library Cornell University Ithaca, NY 14853, Sep. 2, 2019.

* cited by examiner

SYNCHRONIZATION/COORDINATION/CONTROL LINK OR CHANNEL SYSTEM OR METHOD

CROSS-REFERENCE TO RELATED APPLICATION

The present application claims priority to Indian Provisional Patent Application No. 2022-21064888, filed Nov. 12, 2022, the entire contents of which are incorporated by reference in their entirety.

FIELD OF THE DISCLOSURE

This disclosure generally relates to systems for and methods of communication between a station (STA) and access point (AP) or between other communication devices.

BACKGROUND OF THE DISCLOSURE

In the last few decades, the market for wireless communications devices has grown by orders of magnitude, fueled by the use of portable devices, and increased connectivity and data transfer between all manners of devices. Digital switching techniques have facilitated the large scale deployment of affordable, easy-to-use wireless communication networks. Furthermore, digital and radio frequency (RF) circuit fabrication improvements, as well as advances in circuit integration and other aspects have made wireless equipment smaller, cheaper, and more reliable. Wireless communication can operate in accordance with various standards such as IEEE 802.11x, Bluetooth, global system for mobile communications (GSM), code division multiple access (CDMA), etc. As higher data throughput and other changes develop, newer standards are constantly being developed for adoption, such as a progression from IEEE 802.11n to IEEE 802.11ac to 802.11be.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1A:
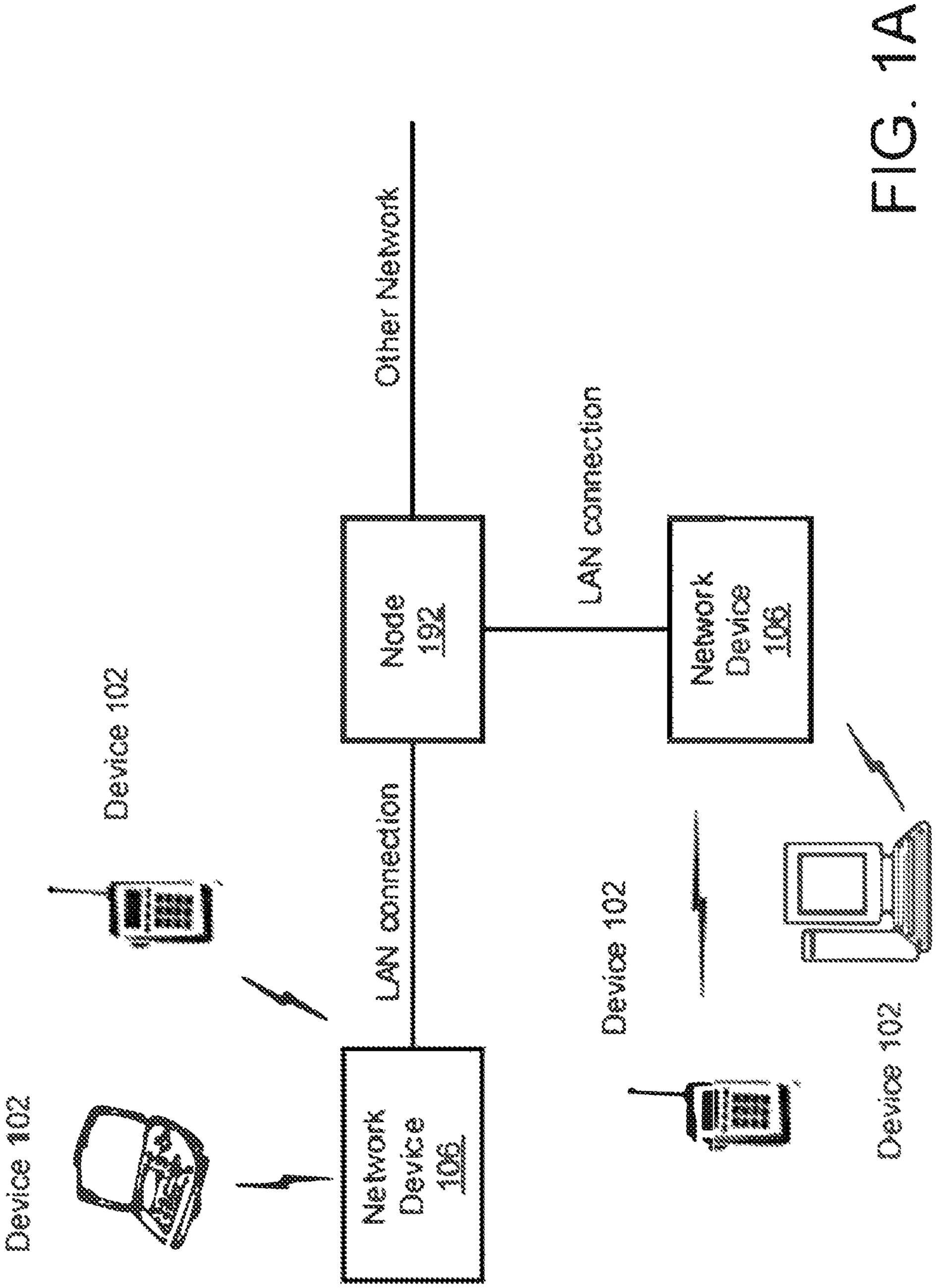
FIG. 1A is a block diagram depicting a network environment including one or more access points in communication with one or more devices or stations, according to some embodiments.

The details of various embodiments of the methods and systems are set forth in the accompanying drawings and the description below.

DETAILED DESCRIPTION

The following IEEE standard(s), including any draft versions of such standard(s) and draft amendments to such standards, are hereby incorporated herein by reference in their entirety and are made part of the present disclosure for all purposes: WiFi Alliance standards and IEEE 802.11 standards including but not limited to IEEE 802.11a™, IEEE 802.11b™, IEEE 802.11g™, IEEE 802.11n™, 802.11be™ and IEEE P802.11ac™ standards. Although this disclosure can reference aspects of these standard(s), the disclosure is in no way limited by these standard(s).

For purposes of reading the description of the various embodiments below, the following descriptions of the sections of the specification and their respective contents can be helpful:

- Section A describes a network environment and computing environment which can be useful for practicing embodiments described herein; and
- Section B describes embodiments of control link protocols and methods and devices using such protocols and methods.

Various embodiments disclosed herein are related to a protocol for handling control and/or latency sensitive information. In some embodiments, the control and/or latency sensitive information is not high in volume, but still competes with higher voluminous traffic on a Wi-Fi network. In some embodiments, the latency-sensitive/control information can be critical to ensure the throughput/latency performance of other data traffic being carried over Wi-Fi. In some embodiments, systems and methods provide a more deterministic scheme for transmission of latency-sensitive/control information. In some embodiments, systems and methods disclosed herein provide for sharing of resources across multiple devices for transmission of latency-sensitive/control information.

In some embodiments, a STA or AP is configured to communicate the control and/or latency sensitive information with less competition for network bandwidth or resources with higher volume traffic than under conventional 802.11 operations. In some embodiments, a STA or AP is configured to provide a resource (e.g., a bandwidth, link or channel) dedicated for the transmission of traffic for the control and/or latency sensitive information. The traffic is generally relatively small in size (e.g., short duration and/or smaller amount of data). In some embodiments, the dedicated resource is a synchronization link or channel, a coordination link or channel, or a control link or channel. In some embodiments, systems and methods communicate latency sensitive or control information without using the priority channel access category scheme associated with conventional 802.11 networks.

The STA or AP can be implemented in a device comprised of one or more integrated circuits (ICs). Latency sensitive information or data may refer to data that has qualities such that the information should be transmitted with less delay because delay would affect the ability to properly use the data in some embodiments. For example, latency sensitive information includes but is not limited to audio data, data that is required to complete a time constrained computing, control, or communication task, data that is used in real time, augmented reality data, virtual reality data, packets for video conferencing, voice packets, or low latency data. Low latency data or information refers to a packet of data which includes a priority for transmission which exceeds a priority of other packets of a same device. Low latency data may be or include latency sensitive information or data; latency sensitive information or data may be conveyed as low latency data. Control information or data may refer to data that has qualities such that the information should be transmitted with less delay because delay would adversely affect communication, control, or computing operations in some embodiments. For example, control information includes but is not limited to information for coordinating non-primary channel usage, handshaking, synchronization information, acknowledge messages or frames, TCP control or TCP acknowledge messages, etc. In some embodiments, the latency sensitive data or control data is provided in a short packet. A packet may refer to a basic unit of data which may be part of larger message or may be a single message in some embodiments. A packet may include data in a format such as a header (e.g., a control data portion—addressing, error detection codes, sequencing information, etc.) and a payload in some embodiments. A short packet may refer to a packet containing hundreds of bits or less (e.g. several hundred bits) in some embodiments.

A channel may refer to any portion of the electromagnetic spectrum used to communicate data in some embodiments. The portions can have various bandwidths and can be combined to form wider bandwidths or channels. Channels can have 5 MHz spacing about a center frequency and can occupy a band of at least 20 MHz in some embodiments. Authentication and association under 802.11 standards provides a method for supplying different levels of access to client devices in a network. Connection between an AP and a STA must generally be authenticated by and associated with an AP before data packets can be exchanged using the connection. A primary channel or primary control channel may refer to a portion of the electromagnetic spectrum used to authorize and/or authenticate connections in some embodiments. In some embodiments, the primary channel is a channel for transmitting beacon signals and other management frames. The primary channel can be indicated in a primary channel field in some embodiments.

Authentication may refer to a procedure for how a client device gains access to the network in some embodiments. Authentication provides proof of identity to ensure the client is allowed access to the network in some embodiments. Association may refer to a handshaking or other procedure for associating two devices in some embodiments. In some embodiments, association refers to a procedure for a client device that has been authenticated to become associated with an AP. Association allows the network to determine where to send data that is intended for a client device (e.g., data is sent through the AP with which the client device is associated) in some embodiments. Generally, a client device is only associated with a single AP. Association can involve an exchange of parameters and information for coordinating communication between the devices (e.g., capability information and secondary channel selection information). Association can involve beacon frames, response frames, and other management frames in some embodiments.

According to some example network operations, an AP uses a primary control channel within a wider bandwidth (e.g., 40/80/160/320 MHz sub bands or channels). Authentication and association are performed over at least the primary control channel. For example, management frames including but not limited to beacon, probe response, deauthentication/disassociation frames are communicated on a channel that includes the primary control channel (e.g., 20 MHz sub band) of a wider bandwidth.

A primary channel or primary control channel may refer to a channel contained within a bandwidth of a larger channel (e.g., wider bandwidth) that includes a secondary bandwidth channel or secondary channel in some embodiments. For example, a link may include a set of contiguous 20 MHz channels where one of the channels is a primary channel. In some embodiments, the primary channel uses an upper half or lower half of the bandwidth of the wider channel, and the secondary channel uses the remaining half of the bandwidth of the wider channel. In some embodiments, the bandwidths of the primary channel and the secondary channel are not equal, and the primary channel occupies a sub band and one or more secondary channels occupy the remaining sub bands in the wider bandwidth. In some embodiments, the secondary channel has more or less bandwidth than the primary channel. In some embodiments, the primary channel is used for client devices that only support a smaller channel bandwidth (e.g., 20 MHz) while the primary channel and the secondary channel(s) can be used for client devices that support wider channel capabilities. In some embodiments, there are multiple secondary bandwidth channels and a single primary bandwidth channel, each having the same bandwidth. The terms primary and secondary do not connote a specific priority and can be interchanged with first and second and vice versa in some embodiments.

In some embodiments, the primary channel may refer to a common channel of operation for all stations (STAs) that are members of the basic service set (BSS) and is monitored for activity where the presence or absence of such activity is one input in an algorithm that determines whether a monitoring STA may attempt to access the medium using, for example, a random access protocol such as the 802.11 EDCA protocol. For example, in a 20 MHz, 40 MHz, 80 MHz, 160 MHz or 80+80 MHz, 320 MHz bandwidth BSS, the primary channel is a 20 MHz channel. The primary channel is used for transmitting all the management frames while the secondary channels are neighboring channels of the primary channel in some embodiments. The secondary channels can combine with the primary channel to form another primary channel of the next wider bandwidth.

A frame may refer to a digital data transmission unit. For example, a frame may refer to a container for a single network packet. A data frame may refer to a frame that contains data. An ACK frame may refer to an acknowledgement message that acknowledges the receipt of a frame, and a block ACK frame may refer to an acknowledgement message that acknowledges the receipt of a number of frames. Parameters for use in non-primary channel utilization can be provided in management frames and acknowledge frames. Management frames may refer to any frame used to provide data control or coordinate communications in some embodiments. Management frames can include frames provided during association and authentication as well as other handshaking and messaging.

Some embodiments relate to a first device for communicating with a second device. The first device is configured to communicate data to the second device using a resource. The resource has a bandwidth of less than 2.1 MHz in a 2.4 GHz link, 5 GHz link, or 6 GHz link, and the data is latency sensitive data or control data.

Some embodiments relate to a first device for communicating with a second device. The first device is configured to communicate data to the second device using a resource. The resource has a bandwidth of less than a total bandwidth of a primary channel of a plurality of links, and the data is latency sensitive data or control data.

In some embodiments, the circuitry is further configured to communicate a frame assigning an opportunity to other devices to transmit on the resource. In some embodiments, the first device includes an access point device communicating via the 802.11be protocol. In some embodiments, the resource is a twenty six tone bandwidth. In some embodiments, each tone has a bandwidth of less than 80 kilohertz wide. In some embodiments, the data is augmented reality data, virtual reality data, packets for video conferencing, or voice packets. In some embodiments, the frame provides time division multiplexing parameters for the resource. In some embodiments, the frame provides frequency division multiplexing parameters for the resource. Voice packets may refer to packets containing voice data including but not limited to voice data used in telephony applications, video conferencing, etc. in some embodiments. Packets for video conferencing may refer to packets containing video, screen presentation data, and/or voice data associated with a video conference in some embodiments. Augmented reality data may refer to control, graphics, audio or video data associated with an augmented reality application in some embodiments. Virtual reality data may refer to control, graphics, audio or video data associated with a virtual reality application in some embodiments.

In some embodiments, the data includes occupancy of a primary channel, occupancy of an enhanced multilink single radio (EMLSR) primary link, or spatial reuse coordination information. In some embodiments, the resource is within the 2.4 GHz link. In some embodiments, the resource is a set of resources each having a bandwidth of less than 2.1 MHz. In some embodiments, the data is for non-primary channel utilization. The data can include information regarding channels and for non-[primary channel utilization and/or device capability. Occupation may refer to a device using a channel such that communication by other devices on the channel is adversely affected (e.g., due to interference, noise, etc.) in some embodiments. In some embodiments, occupation can be caused by an overlapping business service set (OBSS). Occupation can be detected by sensing received signal intensity on the channel or carrier sensing in some embodiments. Occupation can be detected by operations including but not limited to which may include clear channel assessment (CCA) operation or preamble decode operation in some embodiments.

In some embodiments, the data is for non-primary channel utilization. The data can include information regarding channels and for non-primary channel utilization and/or device capability. Occupation may refer to a device using a channel such that communication by other devices on the channel is adversely affected (e.g., due to interference, noise, etc.) in some embodiments. In some embodiments, occupation can be caused by an overlapping business service set (OBSS). Occupation can be detected by sensing received signal intensity on the channel or carrier sensing in some embodiments. Occupation can be detected by operations including but not limited to which may include clear channel assessment (CCA) operation or preamble decode operation in some embodiments. A primary channel may refer to a portion of the electromagnetic spectrum used to authorize and/or authenticate connections in some embodiments. In some embodiments, the primary channel is a channel for transmitting beacon signals and other management frames. The primary channel can be indicated in a primary channel field in some embodiments. The terms primary channel and primary control channel are used interchangeably herein. A secondary channel may refer to a channel that is not a primary channel. Spatial reuse coordination information may refer to data used to coordinate reuse of channels in some embodiments. This information is kept on a spatial reuse group BSS color bitmap of the spatial reuse parameter set, which stores the different BSS colors that belong to the same spatial reuse group in some embodiments. An AP of a given BSS is responsible for maintaining the bit map in some embodiments. An EMLSR primary link may refer to a primary channel for a device communicating using an EMLSR in some embodiments. Non-primary channel utilization refers to an operations for devices switch to a secondary channel when the primary channel is occupied based upon capabilities of the devices in some embodiments.

Some embodiments relate to a first device for communicating on a network. The first device includes circuitry configured to access a first resource and allocate opportunities to transmit a short packet on the first resource or a second resource to other devices. The resource has a bandwidth of less than a total bandwidth of a primary channel of a plurality of links. In some embodiments, the first resource may be used to control the second resource, or may be used directly for low latency data transfers. In some embodiments, the first resource has a limited capacity so it cannot be used extensively for such low latency data transfers, and the first resource is used as a control channel for a second, higher bandwidth capacity resource.

In some embodiments, the first device includes a station (STA) device communicating via the 802.11 be protocol. In some embodiments, the resource has a twenty six tone bandwidth. In some embodiments, the tone has a 78.125 kilohertz wide bandwidth. In some embodiments, the short packet includes augmented reality data, virtual reality data, a packet for video conferencing, or a voice packet.

Some embodiments relate to a method of communicating data with a second device. The method includes providing a short packet containing the data, and communicating the short packet to the second device using a resource, wherein the resource has a bandwidth of less than a total bandwidth of a primary channel of a plurality of links.

In some embodiments, the data is low latency data or control data. In some embodiments, the short packet includes occupancy information for a 20 MHz primary channel. In some embodiments, the short packet includes scheduling information for a 20 MHz primary channel or for other channels.

A. Computing and Network Environment

Prior to discussing specific embodiments of the present solution, it can be helpful to describe aspects of the operating environment as well as associated system components (e.g., hardware elements) in connection with the methods and systems described herein. Referring to FIG. 1A, an embodiment of a network environment is depicted. In brief overview, the network environment includes a wireless communication system that includes one or more access points (APs) or network devices 106, one or more client devices (e.g., STAs) or wireless communication devices 102 and a network hardware component or network hardware 192. The wireless communication devices 102 can for example include laptop computers, tablets, personal computers, and/or cellular telephone devices. The details of an embodiment of each station or wireless communication device 102 and AP or network device 106 are described in greater detail with reference to FIGS. 1B and 1C. The network environment can be an ad hoc network environment, an infrastructure wireless network environment, a subnet environment, etc. in one embodiment. The network devices 106 or APs can be operably coupled to the network hardware 192 via local area network connections. Network devices 106 are 5G base stations in some embodiments. The network hardware 192, which can include a router, gateway, switch, bridge, modem, system controller, appliance, etc., can provide a local area network connection for the communication system. Each of the network devices 106 or APs can have an associated antenna or an antenna array to communicate with the wireless communication devices in its area. The wireless communication devices 102 can register with a particular network device 106 or AP to receive services from the communication system (e.g., via a SU-MIMO or MU-MIMO configuration). For direct connections (e.g., point-to-point communications), some wireless communication devices can communicate directly via an allocated channel and communications protocol. Some of the wireless communication devices 102 can be mobile or relatively static with respect to network device 106 or AP.

In some embodiments, a network device 106 or AP includes a device or module (including a combination of hardware and software) that allows wireless communication devices 102 to connect to a wired network using wireless-fidelity (WiFi), or other standards. A network device 106 or AP can sometimes be referred to as a wireless access point (WAP). A network device 106 or AP can be implemented (e.g., configured, designed and/or built) for operating in a wireless local area network (WLAN). A network device 106 or AP can connect to a router (e.g., via a wired network) as a standalone device in some embodiments. In other embodiments, network device 106 or AP can be a component of a router. Network device 106 or AP can provide multiple devices access to a network. Network device 106 or AP can, for example, connect to a wired Ethernet connection and provide wireless connections using radio frequency links for other devices 102 to utilize that wired connection. A network device 106 or AP can be implemented to support a standard for sending and receiving data using one or more radio frequencies. Those standards, and the frequencies they use can be defined by the IEEE (e.g., IEEE 802.11 standards). A network device 106 or AP can be configured and/or used to support public Internet hotspots, and/or on a network to extend the network's Wi-Fi signal range.

In some embodiments, the access points or network devices 106 can be used for (e.g., in-home, in-vehicle, or in-building) wireless networks (e.g., IEEE 802.11, Bluetooth, ZigBee, any other type of radio frequency based network protocol and/or variations thereof). Each of the wireless communication devices 102 can include a built-in radio and/or is coupled to a radio. Such wireless communication devices 102 and/or access points or network devices 106 can operate in accordance with the various aspects of the disclosure as presented herein to enhance performance, reduce costs and/or size, and/or enhance broadband applications. Each wireless communication device 102 can have the capacity to function as a client node seeking access to resources (e.g., data, and connection to networked nodes such as servers) via one or more access points or network devices 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
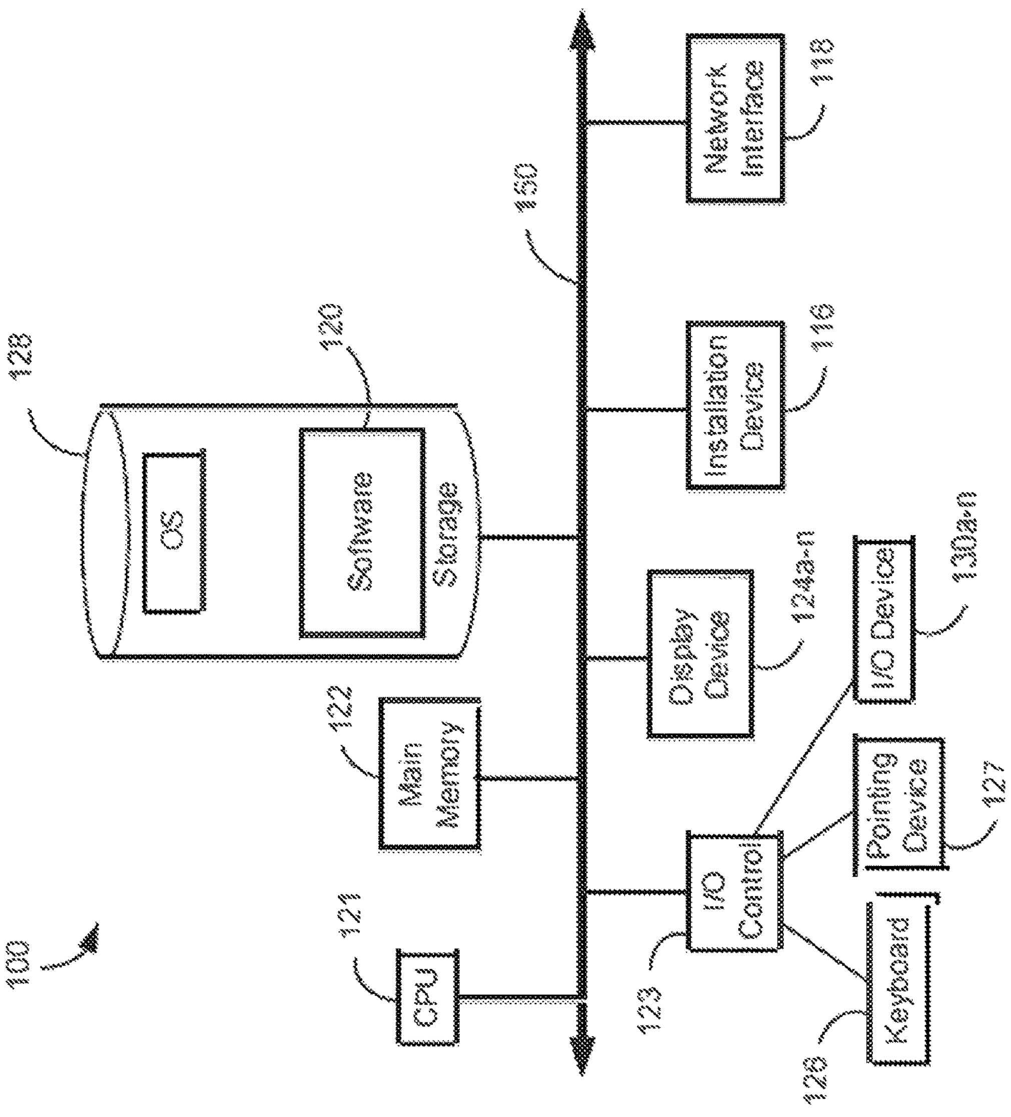
FIGS. 1B and 1C are block diagrams depicting computing devices useful in connection with the methods and systems described herein, according to some embodiments.
Figure 1C:
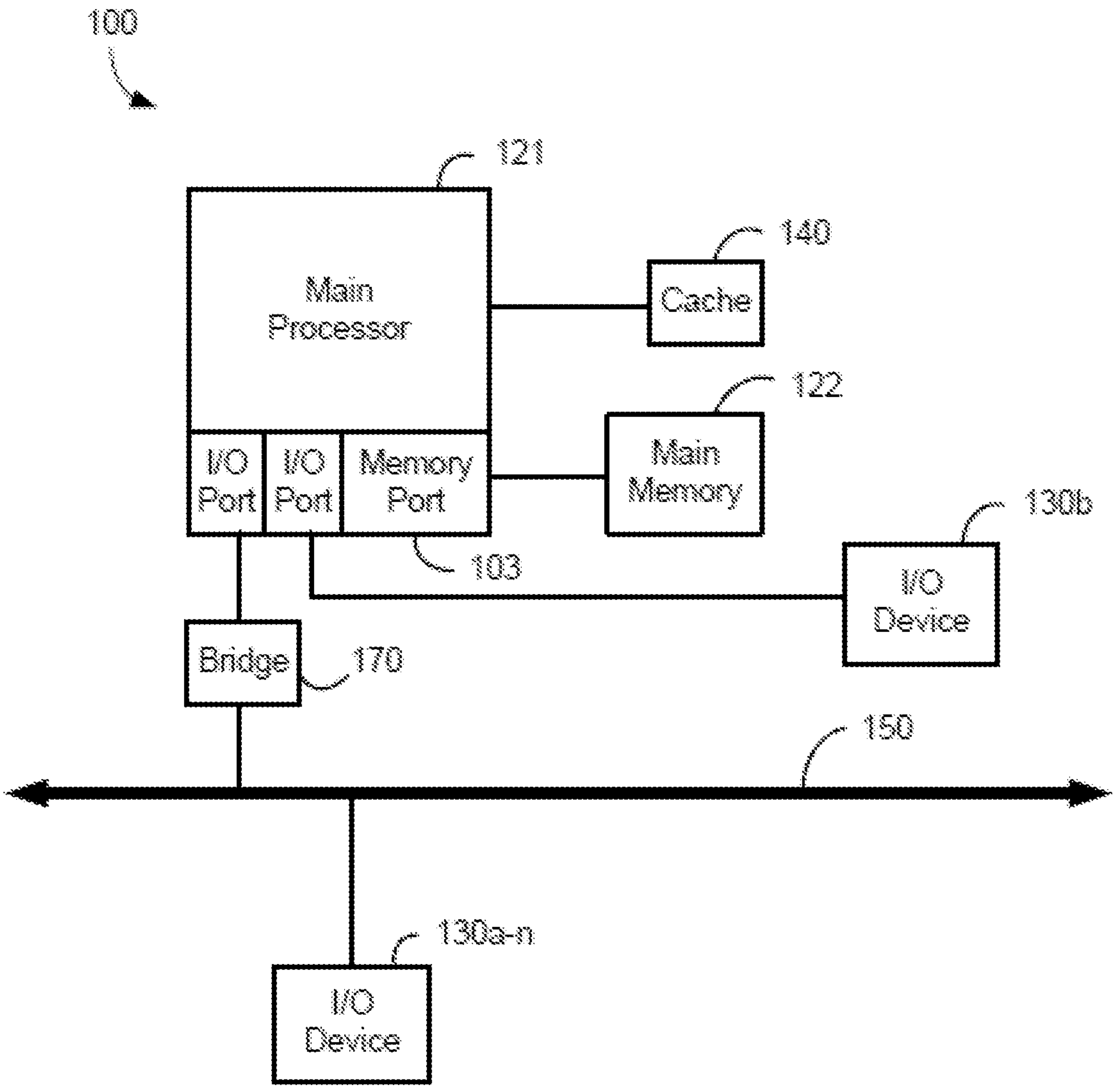

The communications device(s) 102 and access point(s) or network devices 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or network device 106. As shown in FIGS. 1B and 1C, each computing device 100 includes a processor 121 (e.g., central processing unit), and a main memory unit 122. As shown in FIG. 1B, a computing device 100 can include a storage device 128, an installation device 116, a network interface 118, an I/O controller 123, display devices 124*a*-124*n*, a keyboard 126 and a pointing device 127, such as a mouse. The storage device 128 can include an operating system and/or software. As shown in FIG. 1C, each computing device 100 can also include additional optional elements, such as a memory port 103, a bridge 170, one or more input/output devices 130*a*-130*n*, and a cache memory 140 in communication with the central processing unit or processor 121.

The central processing unit or processor 121 is any logic circuitry that responds to and processes instructions fetched from the main memory unit 122. In many embodiments, the central processing unit or processor 121 is provided by a microprocessor unit, such as: those manufactured by Intel Corporation of Santa Clara, California; those manufactured by International Business Machines of White Plains, New York; or those manufactured by Advanced Micro Devices of Sunnyvale, California. The computing device 100 can be based on any of these processors, or any other processor capable of operating as described herein.

Main memory unit 122 can be one or more memory chips capable of storing data and allowing any storage location to be directly accessed by the microprocessor or processor 121, such as any type or variant of Static random access memory (SRAM), Dynamic random access memory (DRAM), Ferroelectric RAM (FRAM), NAND Flash, NOR Flash and Solid State Drives (SSD). The main memory unit 122 can be based on any of the above described memory chips, or any other available memory chips capable of operating as described herein. In the embodiment shown in FIG. 1B, the processor 121 communicates with main memory unit 122 via a system bus 150 (described in more detail below). FIG. 1C depicts an embodiment of a computing device 100 in which the processor communicates directly with main memory unit 122 via a memory port 103. For example, in FIG. 1C the main memory unit 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory unit 122 and is provided by, for example, SRAM, B SRAM, or EDRAM. In the embodiment shown in FIG. 1C, the processor 121 communicates with various I/O devices 130 via a local system bus (e.g., system bus 150). Various buses can be used to connect the central processing unit or processor 121 to any of the I/O devices 130, for example, a VESA VL bus, an ISA bus, an EISA bus, a Micro Channel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer or computer system 100 in which the main processor 121 can communicate directly with I/O device 130*b*, for example via HYPERTRANSPORT, RAPIDIO, or INFINIBAND communications technology. FIG. 1C also depicts an embodiment in which local busses and direct communication are mixed: the processor 121 communicates with I/O device 130*a* using a local interconnect bus while communicating with I/O device 130*b* directly.

A wide variety of I/O devices 130*a*-130*n* can be present in the computing device 100. Input devices include keyboards, mice, track pads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium for the computing device 100. In still other embodiments, the computing device 100 can provide USB connections (not shown) to receive handheld USB storage devices such as the USB Flash Drive line of devices manufactured by Twintech Industry, Inc. of Los Alamitos, California.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124*a*-124*n*. As such, any of the I/O devices 130*a*-130*n* and/or the I/O controller 123 can include any type and/or form of suitable hardware, software, or combination of hardware and software to support, enable or provide for the connection and use of the display device(s) 124*a*-124*n* by the computing device 100. For example, the computing device 100 can include any type and/or form of video adapter, video card, driver, and/or library to interface, communicate, connect or otherwise use the display device(s) 124*a*-124*n*. In one embodiment, a video adapter can include multiple connectors to interface to the display device(s) 124*a*-124*n*. In other embodiments, the computing device 100 can include multiple video adapters, with each video adapter connected to the display device(s) 124*a*-124*n*. In some embodiments, any portion of the operating system of the computing device 100 can be configured for using multiple display devices 124*a*-124*n*. In further embodiments, an I/O device 130 can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a Fibre Channel bus, a fiber optic bus, a Serial Attached small computer system interface bus, a USB connection, or a HDMI bus.

A computing device 100 of the sort depicted in FIGS. 1B and 1C can operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7, 8 and 10, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system or computing device 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. In some embodiments, the computing device 100 can have different processors, operating systems, and input devices consistent with the device. For example, in one embodiment, the computing device 100 is a smart phone, mobile device, tablet or personal digital assistant. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Control Link Protocols

Disclosed herein are systems for and methods of establishing a channel link dedicated to transmission of control and/or latency sensitive traffic which is small in size between devices (e.g., a STA (e.g., wireless client) and an AP) according to some embodiments. The AP and STA establish a wireless connection to communicate data. In some embodiments, establishing a connection involves a three-step process including probing, association, and authentication.

The STA is assigned channel of the AP and negotiates the use of a port. Keyed security measures are applied so communication can take place on the connection. After security requirements are met, an established IP-level communication connection is achieved and communication using networking standards and protocols is performed. The STA generally must be in an authenticated and associated state before the AP will bridge traffic between the STA and other devices on the network. Although association and authentication are described above, the systems and methods can be used with other access processes and protocols including access processes that do not use association or authentication. For example, the systems and methods can be used with an association protocol that is not followed b an authorization protocol.

Referring generally to the FIGS. 2A-5, systems and methods relate generally to wireless network communications. Communicatively coupling may refer to a condition where two or more devices are in direct or indirect communication with each other over a wireless or wired medium in some embodiments. Communicatively coupling an access point (AP) with one or more client devices may refer to an AP and at least one client device reaching a condition of being in direct or indirect communication with one or more devices over a wireless or wired medium in some embodiments.

Operating bandwidth may refer to a range of communication frequencies. Accordingly, the operating bandwidth may include maximum and/or minimum values (e.g., a minimum operating bandwidth, a maximum operating bandwidth). In some embodiments, an operating bandwidth of a particular device refers to a range of frequencies that the particular device may use for wireless network communication. For example, an AP and/or a non-AP device may have an operating bandwidth range that includes a maximum operating bandwidth and/or a minimum operating bandwidth. Values for maximum and minimum operating bandwidths are often defined in communication standards.

Any number of STAs 202, 204, and 206 and APs 212, 214, and 216 can be used in the network or system 200. A station or STA may refer to any device for communicating in communication system 200 and includes but is not limited to a fixed, portable, or mobile laptop, desktop personal computer, personal digital assistant, work station, wearable device, smart phone, or Wi-Fi phone. A STA (e.g., client device) can connect to another STA in some embodiments.

An access point (AP) may refer to a device for communicatively coupling one or more "non-AP" devices (e.g., a client device) to a network. More specifically, an AP may enable non-AP devices to connect and communicate with a network. In some embodiments, an AP is a "wireless access point" (WAP) configured to enable wireless communication between non-AP devices. An AP includes but is not limited to a mobile, portable, or fixed hot spot, router, bridge, or other communication device. An AP can provide services to a STA, such as serving as a connection point to another network. A non AP device may refer to a device that can communicate wirelessly but is not an AP in some embodiments.

STAs 202, 204, and 208 and APs 212, 214, and 216 can each include a wireless transceiver and a various modules for communicating via connections. The modules can be software (e.g., firmware) and/or hardware components. In some embodiments, each of STAs 202, 204, and 206 and APs 212, 214, and 216 includes an IEEE 802.11 standard conformant media access control (MAC) layer circuit and physical (PHY) layer interface to the wireless medium and can be part of a larger device or system. In some embodiments, each of STAs 202, 204, and 206 and APs 212, 214, and 216 operates according to other standards than the IEEE 802.11 standard. In some embodiments, STAS 202, 204, and 206 and APs 212, 214, and 216 can communicate directly to each other (e.g., via direct connections outside of the network associated with system 200).

A connection for wireless communication can be established between at least one of STAs 202, 204, and 206 and APs 212, 214, and 216 after authentication and association. For example, STA 202 has a connection 218 to AP 212. STAs 202, 204, and 206 each include circuitry (e.g., a processor or processing circuit 230), and APs 212, 214, and 216 each include circuitry (e.g., a processing circuit 220) for establishing and cancelling the connection 218 and communicating data across the connection 218. The connection 218 is a wireless connection formed using an association and authorization operation in some embodiments. Connection 318 can be used to communicate data such as a frame.

In some embodiments, connection 218 is a connection that uses a resource as a synchronization, coordination, or control link or channel. A resource may refer to a portion of the electromagnetic spectrum used for communication in some embodiments. The resource can be a bandwidth associated with any frequency band (e.g., an IEEE 802.11 frequency band). In some embodiments, system 200 is a coordinated IEEE 802.11 network. In some embodiments, system 200 includes an AP configured as a coordinator which coordinates the communication within the network. In some embodiments, a STA or AP (e.g., of STAs 202, 204, and 206 and APs 212, 214, and 216) that wins access to the resource (e.g., the control channel/link) can allocate opportunities to all other devices to transmit the control/high priority short packets. In some embodiments, information is exchanged at network start up and/or allocation so that a coordinator AP can select or assign the resource for handling control and/or latency sensitive information. The coordinator AP can increase the number or capability of the resource depending on traffic for the handling control and/or latency sensitive information. In some embodiments, information for sharing the resource can be exchanged at association or network setup in some embodiments.

Components of STAs 202, 204, and 206 and APs 212, 214, and 216 can be provided as one or more integrated circuits (IC) in an IC package. The IC package can by a single chip package or a multichip module. STAs 202, 204, and 206 and APs 212, 214, and 216 operating according to the 802.11be standard may support 320 MHz as the maximum bandwidth of operation on any one link in some embodiments. Non-AP devices (shown as device(s) 102 in FIG. 1A), such as STAs 202, 204, and 206 may support a bandwidth less than 320 MHz. Accordingly, an AP or network device 106 may utilize a channel switching protocol to improve network traffic (e.g., uplink traffic and downlink traffic) from the AP or network device 106 to the non-AP(s) or wireless communication devices 102 (FIG. 1C).

In some embodiments, system 200 may operate on one or more links. For example, an AP 212 that operates on more than one link is an AP Multi Link Device (AP MLD). An AP MLD operating on two links typically utilizes one 5 gigahertz (GHz) link and one 6 GHz link. In some embodiments, a 5 GHz link is 160 MHz and narrower in bandwidth. In some embodiments, a 6 GHz link is up to 320 MHz in bandwidth. In some embodiments, the AP MLD may, optionally, have an additional 2.4 GHz link. In some embodiments, the 2.4 GHz link has a narrower bandwidth than the 5 and 6 GHz links. STA 208 operating on a link with an AP 212 where the STA operating bandwidth is narrower than the AP bandwidth on that link may be configured to switch between primary and secondary channels of the AP operating bandwidth. For example, a 320 MHz operating bandwidth of an AP may be divided into a 160 MHz primary (160P) sub channel and a 160 MHz Secondary (160S) sub channel. It should be understood that other bandwidth values are possible. For example, a 160 MHz operating channel may be divided into 4×40 MHz sub channels, a first sub channel of which is the primary channel and the others are secondary channels. In some embodiments, the width of the sub channels can be 20 MHz or 40 MHz or 80 MHz or 160 MHz, etc., while the width of the operating channel can be 40 MHz, 80 MHz, 160 MHz, 320 MHz, etc. In some embodiments, the sub channels are broadband wireless access (BWA) sub channels.

In some embodiments, STA 208 associated with an AP 212 normally operates on a portion of the entire operating channel which includes the primary 20 MHz sub channel or channel that is designated by the AP 212 as the primary 20 MHz channel. When, for example, two 160 MHz STAs are associated with an AP 212 operating a 320 MHz channel, those two STAs will operate on the same 160 MHz sub channel of the 320 MHz operating channel. Because the 20 MHz primary exists in only one location and both STAs must include that 20 MHz primary channel in a respective operating width. A STA that can switch from the primary sub channel or channel to operate, at least temporarily, on a different sub channel or channel that does not include the primary 20 MHz sub channel or channel is labeled as bandwidth aggregation (BWA) STA and/or a STA. Such a STA indicates this capability when associating with an AP. The terms sub channels and channels and bandwidth and sub bandwidth can be used interchangeably in some embodiments.

For example for a 320 megahertz bandwidth for a primary channel and secondary channels, each 20 MHz channel can be available or not available independently because there are other Wi-Fi devices which operate with smaller bandwidths (e.g., other technologies—the granularity of access is 20 megahertz in the unlicensed spectrum for some technologies and transmission powers). A use of a particular 20 megahertz channel can restrict Wi-Fi channel access.

Figure 2A:
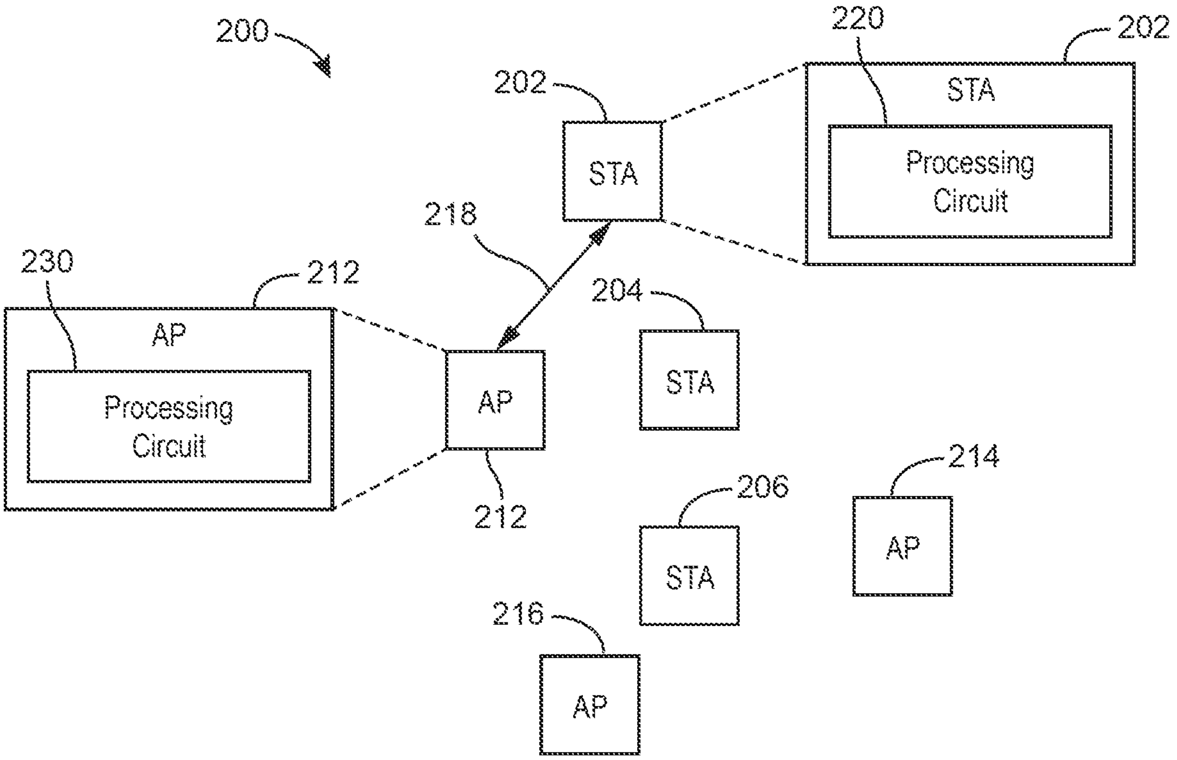
FIG. 2A is a block diagram depicting a network including access points (APs) and stations (STAs), according to some embodiments.
Figure 2B:
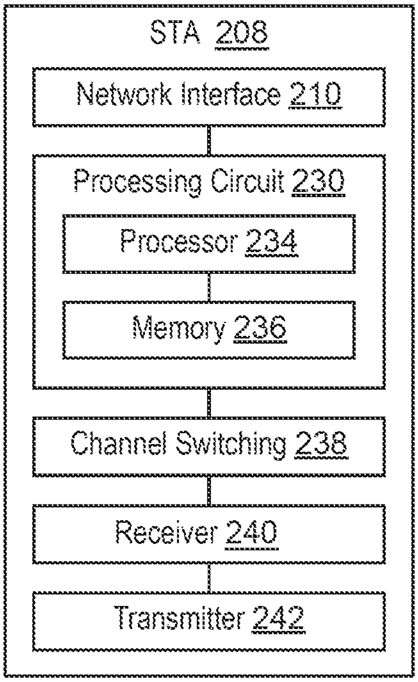
FIG. 2B is a more detailed block diagram of a STA configured for non-primary channel utilization operations according to some embodiments.

Referring to FIG. 2B, a STA 208 is configured for non-primary channel utilization according to some embodiments. In some embodiments, the STA 208 includes a network interface 210, processing circuit 230, a channel switching module 238, a receiver 240, and a transmitter 242. The processing circuit 230 includes a processor 234 and a memory 236. Processing circuit 230 is any circuitry or components that can perform logic and communication processing for STA 208. AP 212 can have a similar architecture and components as STA 208 and be configured for non-primary channel utilization. STAs 202, 204, and 206 and APs 214, and 216 can have similar architecture and components to STA 208.

In some embodiments, the processing circuit 230 is implemented as a field-programmable gate array, an application-specific integrated circuit, hardware, a software executing processor, or state machines. In some embodiments, the processing circuit 230 is part of layers (e.g., MAC, network, PHY layers) of IEEE 802.11 standard devices. The processing circuit 230 can be configured to perform communication operations, non-primary channel operations and setup therefor, channel selection, frame building and processing, association operations, authorization operations, connection setup, disassociation operations, and deauthentication operations in some embodiments. Instructions for the processing circuit 230 can be stored in a non-transitory medium such as memory 236 in some embodiments. Processing circuit 230 of AP 212 is similar to processing circuit 230.

The memory 236 may be one or more devices (e.g., RAM, ROM, Flash memory, hard disk storage) for storing data and/or computer code for completing and/or facilitating the various processes described herein. The memory 236 may be or include non-transient volatile memory, non-volatile memory, and non-transitory computer storage media. Memory 236 may include database components, object code components, script components, or any other type of information structure for supporting the various activities and information structures described herein. Memory 236 may be communicably coupled to the processor 234 and include computer code or instructions for executing one or more processes described herein. The processor 234 may be implemented as one or more application specific integrated circuits (ASICs), hardware, field programmable gate arrays (FPGAs), a group of processing components, and a software executing processor, state machines or other suitable electronic processing components. As such, STA 208, AP 212 or network device 106 (FIGS. 1A-C) is configured to run a variety of modules and/or programs and store associated data in a database of the memory 236. The modules (e.g., module 238) can be implemented in AP software (e.g., MAC layer or PHY layer software) or STA software (e.g., MAC layer or PHY layer software).

In some embodiments, the network interface 210 is structured and used to establish connections with other computing systems and devices (e.g., wireless communication device(s) 102, network hardware 192, other access points or network devices 106 (FIGS. 1A-C) via a network (e.g., WAN connection, LAN connection, WLAN connection, etc.). The network interface 210 includes program logic that facilitates connection of the STA 208 to the network connections. For example, the network interface 210 may include any combination of a wireless network transceiver (e.g., a cellular modem, a Bluetooth transceiver, a Wi-Fi transceiver, transmitter 242, etc.) and/or a wired network transceiver (e.g., an Ethernet transceiver). In some arrangements, the network interface 210 includes the hardware (e.g., processor, memory, and so on) and machine-readable media sufficient to support communication over multiple channels of data communication. A network interface or network interface circuit may refer to any circuit or circuitry (with or without software) configured to establish connections with other computing systems. The network interface 210 can include a physical layer circuitry necessary for communicating with a data link layer standard, such as Ethernet or Wi-Fi. The circuit can prepare and control the flow of data on the network.

In various embodiments, transmitter 242 is a transmitter module (sometimes referred to as a "transmitter circuit"). The transmitter 242 can be configured to provide or transmit wireless signals representing data or frames. A transmitter may refer to any circuit for communicating radio frequency data, such as frames. Transmitter 242 can include circuitry for encoding, modulating, processing and providing frames as wireless signals.

In various embodiments, receiver 240 is a receiver module (sometimes referred to as a "receiver circuit"). The receiver 240 can be configured to receive wireless signals representing data or frames. A receiver may refer to any circuit for communicating radio frequency data, such as frames. Receiver 240 can include circuitry for decoding, demodulating, processing and providing frames derived from transmitted wireless signals.

In some embodiments, processing circuit 230 includes a channel switching module 238 (sometimes referred to as a "channel switching circuit 238"). The channel switching module 238 can be configured to communicatively couple with one or more client devices or STA 208 (e.g., non-AP devices) and can be configured to allocate the one or more STAs 202, 204, 206, and 208 and APs 212, 214, and 216 on one of a primary channel or a secondary channel (e.g., an anchor channel). In particular, the channel switching module 238 can be configured to perform the non-primary channel utilization operations described herein. For example, the channel switching module 238 can be configured to determine network traffic associated with the STA 208. Accordingly, the channel switching module 238 may utilize a channel switching protocol to improve network traffic (e.g., uplink traffic and downlink traffic) from the AP 212 to the STA 208. The channel switching protocol includes a protocol for moving between primary and secondary channels. In particular, channel switching module 238 can enable an AP 212 or STA 208 to dynamically switch between channels based on, for example actual network traffic and/or expected network traffic. For example, the channel switching module 238 can be configured to switch from a primary bandwidth channel to operate on a secondary bandwidth channel when the primary channel becomes busy due to network traffic that is unrelated to this BSS and is indicated to be busy for at least the next 3 milliseconds (ms). A channel switching circuit or unit may refer to any circuit or circuitry (with or without software) configured to designate one or more devices to communicate on a channel or portion of a channel.

In various embodiments, channel switching for non-primary channel utilization is executed by channel switching module 238. In particular, the channel switching module 238 can be configured to cause AP 212 or STA 208 to choose channels in accordance with information obtained earlier (e.g., during association) in some embodiments. Channel switching module 238 may operate with or share operations with other components of STA 208 or AP 212 to effect channel selection, non-primary channel utilization, and control link utilization in some embodiments.

Figure 3:
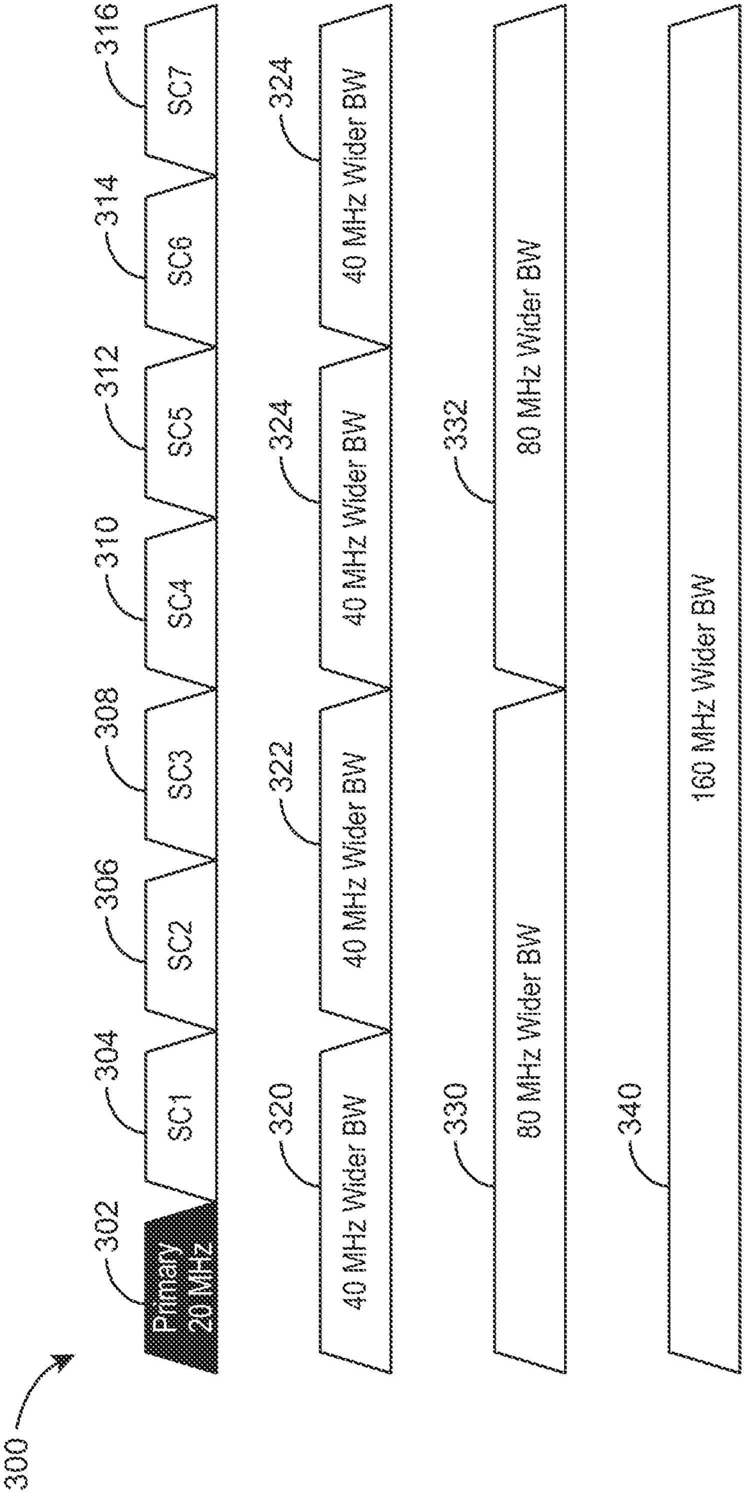
FIG. 3 is a block diagram of a wider bandwidth including sub bands for use in the network illustrated in FIG. 2A, according to some embodiments.

With reference to FIG. 3, AP 212 can communicate with STA 204 using a channel 300 in some embodiments. Channel 300 includes a primary channel 302 (e.g., 20 MHz), a secondary channel 304 (e.g., 20 MHz), a secondary channel 306 (e.g., 20 MHz), a secondary channel 308 (e.g., 20M Hz), a secondary channel 310 (e.g., 20 MHz), a secondary channel 312 (e.g., 20 MHz), a secondary channel 314 (e.g., 20 MHz), and a secondary channel 316 (e.g., 20 MHz). Any of secondary channels 304-316 can be a primary control channel, and primary channel 302 can be changed to a secondary channel. Channel 300 can also be apportioned as a single wider bandwidth 340 (e.g., 160 MHz), as a wider bandwidth 330 (e.g., 80 MHz) and a wider bandwidth 332, (e.g., 80 MHz). Channel 300 can also be apportioned as a wider bandwidth 320 (e.g., 40 MHz), a wider bandwidth 322 (e.g., 40 MHz), a wider bandwidth 324 (e.g., 40 MHz), and a wider bandwidth 326 (e.g., 40 MHz). Communications can occur on any channel 302-316 or wider bandwidths 320-340. Channels 302-316 and wider bandwidths 320-340 can be referred to as channels, sub bands, bandwidths, or bandwidth channels.

In some embodiments, transmitter 242 is configured to have parallel multiple channel capabilities. Transmitter 242 can include multiple radio components for operating in parallel on multiple channel in some embodiments. In some embodiments, the multiple channel capabilities allow STA 208 to perform full clear channel assessment (CCA) operations in parallel on multiple channels in its operating bandwidth, including the primary channel (e.g., primary channel 302). If the primary channel is busy, the CCA operation is performed on other channels (e.g., secondary channels (e.g., channels 304-316). In some embodiments, STA 208 is configured to perform full CCA operations in parallel on multiple channels, thereby reducing the delay in gaining access to non-primary channels. In some embodiments, the CCA operation is performed on a number N of channels in parallel. The number N can be any integer number (e.g., 2, 4, 5, 8, 16, 32 etc.). In some embodiments, the number N is related to the capabilities of transmitter 242 and receiver 240. Performing CCA operations in parallel may refer to CCA operations that are at least partially performed on different channels at the same time, nearly the same time, or in a same time period in some embodiments.

Clear channel assessment (CCA) may refer to an operation performed by any device to determine if a channel is clear (e.g., clear for a period of time (e.g., random)) in some embodiments. The CCA can be performed in an unlicensed spectrum because the device does not have exclusive access and generally has to determine if the channel is clear.

In some embodiments, transmitter 242 may not be configured to have multiple parallel channel capabilities. In some embodiments, the STA 208 is configured to perform full CCA operations (e.g., ED plus virtual CCA and preamble detection (PD)) on only one channel at a time. In some embodiments, a transmitter 242 without parallel multiple channel capabilities is configured to perform full CCA operations on other channels after it determines the primary channel is busy and the source and/or destination of the busy channel is not relevant to the STA 208 and/or BSS. In some embodiments, sequential CCA operations (e.g., suitable for devices which cannot perform full CCA in parallel on multiple channels) can delay gaining access on the idle non-primary channels. Performing CCA operations sequentially may refer to CCA operations that are at least partially performed on different channels at different times (e.g., one after the other) in some embodiments. STA 208 is configured to perform sequential CCA operations only during the occupancy of the primary channel (e.g., channel 302) which is determined by examining the duration of the physical layer protocol data unit (PPDU) and/or transmission opportunity (TXOP) occupying the primary channel in some embodiments.

The PPDU may refer to a frame containing a preamble and data fields in some embodiments. The preamble field contains the transmission vector format information in some embodiments. The TXOP may refer to the time duration during which STA 208 can exchange frames after it has gained control of the transmission medium through a contention process in some embodiments. By providing this information regarding expected frame exchange time period, TXOP aims to increase the throughput of high priority data, such as voice and video and to provide virtual medium occupancy information used by other STAs when performing CCA operation.

In some embodiments, receiver 240 is configured to have multiple parallel channel capabilities. Receiver 240 can include multiple radio components for operating in parallel on multiple channel in some embodiments. Receiver 240 is configured to perform preamble decode in parallel on multiple channels in its operating bandwidth, including the primary channel (e.g., primary channel 302). Accordingly, transmitter 242 can choose any of those non-primary channels (e.g., secondary channels 304-316) for transmitting data to the receiver 240. For a receiver 240 that has a single receive chain for the entire link, once the preamble decode commences on a certain channel, preambles on the remaining channels that are on-air during that brief period of time when the preamble decode is ongoing on one particular channel may not be received. In some embodiments, the receiver 240 is configured to reallocate receiver chain resources away from the primary channel after sufficient information has been decoded by the receiver chain to determine the duration of the primary channel occupancy and the relevance of the busy channel, where relevance is at least partially determined by either the identity of the BSS of the STAs involved in the frame exchange that is creating the busy channel condition or where the busy condition is not due to a transmission created by or intended to be received by the intended peer of STA 208.

In some embodiments, receiver 240 may not be configured to have multiple parallel channel capabilities. Receiver 240 may be configured to perform a preamble decode operation on only one channel at a time in some embodiments. In some embodiments, receiver 240 is configured to perform preamble decode operations on other channels after receiver 240 or STA 208 determines the primary channel is busy. In some embodiments, a STA 208 that cannot perform preamble decode operations in parallel on multiple channels performs a sequential preamble decode operation. A sequential preamble decode operation can limit the flexibility of transmitter 242 (of another device) choosing any of the non-primary channels for transmitting data to the receiver 240. In some embodiments, once STA 208 determines that the primary channel becomes occupied by non-relevant devices (for example, devices that are not members of the same BSS as the receiver 240) and the receiver 240 has decoded sufficient information to determine the duration of the primary channel occupancy, then the receiver 240 may switch to alternative channel(s) for possible reception on those channel(s). Non-relevant devices may refer to any devices that are not engaged in frame exchanges involving the intended peer of STA 208 in some embodiments. STA 208 and AP 212 can have a receiver and a transmitter with the respective capabilities of receiver 240 and transmitter 242 discussed above.

A preamble decode operation may refer to an operation performed by any device to determine a preamble to detect a presence of a packet on a channel, in some embodiments. Performing preamble decode operations in parallel may refer to preamble decode operations that are at least partially performed on different channels at the same time, nearly the same time, or in a same time period in some embodiments. Performing CCA preamble decode operations sequentially may refer to CCA operations that are at least partially performed on different channels at different times (e.g., one after the other) in some embodiments.

Figure 4:
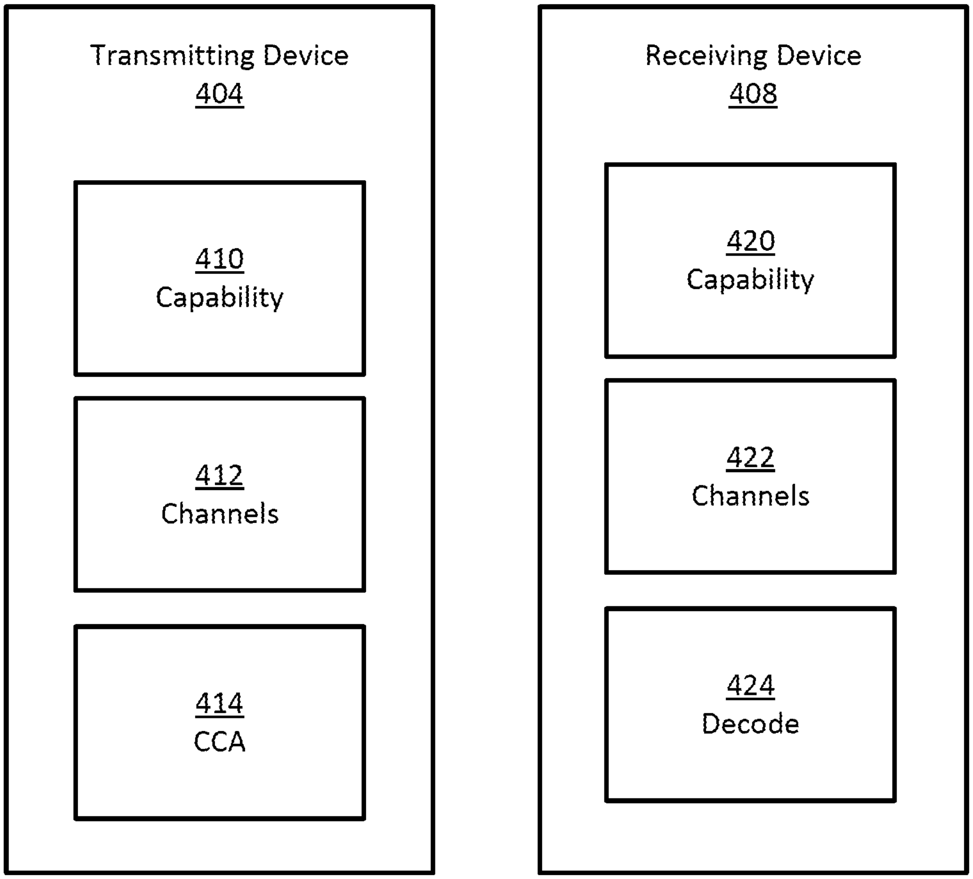
FIG. 4 is a block diagram depicting a transmitting device and a receiving device configured for non-primary channel utilization according to some embodiments.

Non-primary channel utilization operations are discussed below with respect to a transmitting device 404 and receiving device 408 with reference to FIG. 4. In some embodiments, the transmitting device 404 is a STA or AP, such as, STAs 202, 204, 206, and 208 and APs 212, 214, and 216 operating according to an 802.11 standard as modified herein. In some embodiments, the receiving device 408 is a STA or AP, such as STAs 202, 204, 206, and 208 and APs 212, 214, and 216 operating according to an 802.11 standard as modified herein. In some embodiments, receiving device 408 and transmitting device 404 include similar components.

Transmitting device 404 includes a processing circuit or other circuitry configured to provide the operations as described herein. In some embodiments, transmitting device 404 includes a memory or storage device 410 for storing capabilities of device 404 and other devices including receiving device 408, a memory or storage device 410 for storing channels for use in non-primary channel utilization, and a CCA module 414 for CCA operations. In some embodiments, receiving device 408 includes a memory or storage device 410 for storing capabilities of device 408 and other devices including transmitting device 404, a memory or storage device 410 for storing channels for use in non-primary channel utilization, and a decode module 414 for preamble decode operations.

When the receiving device 408 receives an indication of some external OBSS (Overlapping BSS) (e.g., detects a preamble from another set of devices outside the network), the receiving device 408 assumes that the transmitting device 404 also has detected the OBSS and moves to the next channel in a particular order for the transmission. To lower the probability that the transmitting device 404 has not detected the OBSS while the receiving device 408 has and vice versa, a threshold for detecting the OBSS can be increased. For example, the threshold for signal strength from the OBSS can be increased to increase the probability that both the receiving device 408 and transmitting device 404 detect the OBSS. In some embodiments, the threshold is set at −72 dBm and can be increased to −62 dBm.

In some embodiments, if the channels can be decoded in parallel, a set delay for the receiving device 408 can be used for a retuning operation to start listening on multiple channels. If the channels can be decoded serially, then the receiving device 408 has to switch from one channel to the other, and the delay can be different. A set of delays can be provided for the retuning operation. In some embodiments, operations and capabilities including receiver and transmitter capabilities and/or anchor channels are provided during association (at the beginning of association). Such information can be provided in messages of frames (e.g., management frame provided during association). A retune or retuning may refer to on operation where radio a component is set to a different frequency or bandwidth from its current frequency or bandwidth in some embodiments.

In some embodiments, the transmitting device 404 and receiving device 408 can operate according to a first non-primary channel utilization operation if the receiving device 408 is configured to have parallel multiple channel capabilities and the transmitting device 404 is configured to have parallel multiple channel capabilities or is configured to perform full CCA operations (i.e. ED plus virtual CCA and preamble detection) on only one channel at a time. According to the first non-primary channel utilization operation, non-primary channel utilization is possible if the receiving device 408 supports preamble decode operations on multiple channels in parallel. In the first non-primary channel utilization operation, the transmitting device 404 and the receiving device 408 agree on a set of anchor channels. The set can be determined based upon information exchanged between the receiving device 408 and the transmitting device 404 in some embodiments. The information can include capability information related to the capabilities of respective transmitter 242 and receivers 240. The information can be exchanged during association or authentication, in response to requests, during synchronization, or in other handshaking operations in some embodiments. Anchor channels can refer to any channels determined to be used for non-primary channel utilization in some embodiments. The anchor channels can be provided as a list during association or handshaking of two devices in some embodiments. An anchor channel can be a bandwidth associated with a wider bandwidth that serves a channel for the wider bandwidth. An anchor channel can be channel on which beacon and other broadcast frames are transmitted in some embodiments. All PPDU transmission do not necessarily include an anchor channel.

According to one example, if transmitting device 404 is capable of performing CCA in parallel over four 20 MHz channels and the receiving device 408 is capable of receiving preambles in parallel over four 20 MHz channels and the operating bandwidth is 80 MHz (e.g., four 20 MHz channels), there is no anchor channel. The transmitting device 404 is free to transmit on any 20 MHz channel and the receiving device 408 is able to decode the transmission. If the operating bandwidth is 160 MHz (e.g., eight 20 MHz channels) as opposed to 80 MHZ, parallel operation covers 80 MHz of the 160 MHz operating bandwidth in one example. In some embodiments, the transmitting device 404 and the receiving device 408 can split the bandwidth into four groups of 40 MHz of bandwidth, where each 40 MHz bandwidth has one 20 MHz anchor channel. In some embodiments, out of the 8 channels (e.g., operating bandwidth of 160 MHz), the transmitting device 404 and the receiving device 408 select four channels which serve as anchor channels and can operate in parallel where the receiving device 408 attempts to decode preambles. Any transmission include at least one of these four channels. The other four channels can be included as long as the transmission uses at least one of the anchor channels which allows the receiving device 408 to detect and decode the preamble.

The number of anchor channels is less than or equal to the number of channels on which the receiving device 408 supports parallel preamble decode operations in some embodiments. In some embodiments, the number of anchor channels is more than the number of channels on which the transmitting device 404 supports parallel CCA operations. The anchor channels can be equally spaced in the operating bandwidth of the transmitting/receiving device 408, and the first anchor channel is the primary 20 MHz channel in some embodiments.

In some embodiments, transmissions are provided on at least one of the anchor channels associated with a first non-primary channel utilization operation. In one example where the number of channels on which the transmitting device 404 supports parallel CCA operations is smaller than the number of anchor channels, the transmitting device 404 can partition the anchor channels into smaller sets with the same number of channels on which the transmitting device 404 supports parallel CCA operations. In some embodiments, the transmitting device 404 starts fresh CCA operations or processes and medium synchronization operations or processes on a first set and moves from one set to the next set if the first set selected is determined to be busy for some minimum duration.

In some embodiments, a primary 20 MHz channel is not a part of a transmission if the primary channel is occupied by an overlapping BSS (OBSS). The primary 20 MHz channel is not a part of a transmission only for that duration in first non-primary channel utilization operation in some embodiments. In some embodiments, the perspective of the transmitting device 404 alone matters. Since the receiving device 408 is capable of decoding preambles in parallel on the other anchor channels, the receiving device 408 seeing the OBSS on the primary 20 MHz does not adversely affect the first non-primary channel utilization operation in some embodiments. In some embodiments, the receiving device 408 is capable of receiving a preamble on any of those channels irrespective of the primary 20 MHz being busy because the number of anchor channels is less than or equal to the number of channels on which the receiving device 408 supports parallel preamble decode operation, and because the anchor channels are negotiated or selected previously.

In some embodiments, before the transmitting device 404 transmits on any of the anchor channels, the transmitting device 404 allows the receiving device 408 a time gap (e.g., a SameSetDelay parameter) to retune to a state where the receiving device 408 can again decode preambles on all the anchor channels if the transmitting device 404 has detected a preamble on any of the other anchor channels. The SameSetDelay parameter can be negotiated or derived from information received or exchanged between the receiving device 408 and the transmitting device 404 (e.g., during association).

In some embodiments, the transmitting device 404 and receiving device 408 can operate according to a second non-primary channel utilization operation if the receiving device 408 is configured to have parallel multiple channel capabilities or is configured to perform a sequential preamble decode operation and the transmitting device 404 is configured perform full CCA operations in parallel or is configured to perform full CCA operations (i.e. energy detect (ED) plus virtual CCA) on only one channel at a time. According to the second non-primary channel utilization operation, non-primary channel utilization is possible even if the receiving device 408 supports preamble decoding operations on only one channel at a time. In some embodiments, the receiving device 408 is configured to support preamble decode operations on one channel at a time and is configured to switch to an alternative channel after determining the relevance and duration of the occupancy (e.g., OBSS occupancy) of the primary channel.

In some embodiments, the transmitting device 404 and the receiving device 408 agree on an order of using different channels for data exchange without there being any anchor channels in a second non-primary channel utilization operation. In some embodiments, the order is TR1, TR2, etc. where TR1 and TR2 represent data transfers (e.g., on a sequence of channels). In some embodiments, the transmitting device 404 has its own sequence of sets of channels where parallel CCA operations are performed. In some embodiments, the sets are T1, T2, etc., where T1 and T2 are sets of channels. In some embodiments, the transmitting device 404 is configured to perform CCA operations by decoding preambles on the first channel or set of channels in the sequence of channels for data transfer TR1. This set includes the primary 20 MHz channel and thus, has overlap with the first channel or set of channels negotiated for data transfer TR1 in some embodiments. If enhanced distributed channel access (EDCA) completes (i.e. the device wins channel access) on any channel that corresponds to TR1, the device transmits on that channel for data transfer TR1 in some embodiments.

Before transmitting on any channel of the set, if the transmitting device 404 has detected a preamble on any of the channels in data transfer TR1, the transmitting device 404 is configured to allow the receiving device 408 to retune in a time gap corresponding to a SameSetDelay parameter for data transfer TR1 in some embodiments. If no channel that corresponds to data transfer TR1 is available and the primary 20 MHz channel is occupied by an OBSS, the transmitting device 404 attempts to transmit on the second channel or set of channels for the data transfer TR2 only for the duration for which the primary 20 MHz channel is busy for data transfer TR1 in some embodiments. While attempting transmission on the next set of channels, the transmitting device 404 allows or awaits a time gap corresponding to an OtherSetDelay parameter for the receiving device 408 in some embodiments.

If the second channel or set of channels for data transfer TR2 is outside of the set of channels T1, the second channel or set of channels is expected to be a part of data transfer TR2 in some embodiments. In that case, the transmitting device 404 needs to start fresh CCA processes on channel T2. Also, in that case, a medium synchronization process is used. Medium synchronization may be performed through enforcement of request to send/clear to send (RTS/CTS) in the beginning of the transmission, usage of a lower CCA threshold or/and setting a limit on the maximum number of failed attempts in some embodiments.

While the primary 20 MHz channel is busy and the second set of channels for data transfer TR2 is also not available, the transmitting device 404 attempts to transmit on the set of channels for data transfer TR3 (starting fresh CCA processes if data transfer TR3 has channels outside of channel T3) in some embodiments. This continues until all channels are seen to be unavailable in some embodiments.

In some embodiments, control returns to the first set of channels for the data transfer TR1 once the duration determined during decode (e.g. NAV or PPDU length) on the primary 20 MHz channel expires. Upon returning to the primary 20 MHz channel, medium synchronization process need not be used if the return is before the expiry of the decoded duration.

According to one example, the transmitting device 404 and the receiving device 408 operate in a serial manner over multiple sets of channels. In some embodiments, with the same capability as described in the anchor channel example above (the transmitting device 404 being capable of performing CCA in parallel over four 20 MHz channels and the receiving device 408 being capable of receiving preambles in parallel over four 20 MHz channels), the transmitting device 404 and the receiving device 408 split the channels into two groups of four channels each when the operating bandwidth is 160 MHz. The two groups are channels for data transfers TR1 and TR2. When operating on group TR1, the transmitting device 404 and the receiving device 408 can exchange data on any of the four 20 MHz channels of TR1 without any anchor channels. When none of the channels of group TR1 are available, the operation moves to group TR2 and there are no anchor channels in any set. In some embodiments, where the transmitting device 404 and the receiving device 408 capable of supporting CCA/preamble decode on only one channel at a time (e.g., non-parallel operations), each group TR1, TR2, etc. will contain only one channel each (e.g., there will be eight sets of one channel each).

A network allocation vector (NAV) can refer to a virtual carrier-sensing mechanism used with wireless network protocols such as IEEE 802.11 (Wi-Fi) and IEEE 802.16 (WiMax). The virtual carrier-sensing can be a logical abstraction which limits the need for physical carrier-sensing at the air interface of a listening device that is performing CCA in order to save power and to allow determination of a busy channel where the occupying transmission might not be detectable by a listening device due to the topographical relationship between the transmitting and listening devices. The MAC layer frame headers contain a duration field that specifies the transmission time required for the transmission of one or more frames of a frame exchange, during which time the medium will be busy. The STAs listening on the wireless medium read the duration field and set their NAV, which is an indicator for a station on how long it must defer from accessing the medium in some embodiments.

The NAV uses a counter which counts down to zero at a uniform rate in some embodiments. When the counter is zero, the virtual carrier-sensing indication is that the medium is idle; when nonzero, the indication is busy. The medium or channel is generally determined to be busy when the STA is transmitting. In IEEE 802.11, the NAV represents the number of microseconds the sending STA intends to hold the medium busy for its transmission and any responding transmission made by its intended recipient STA and optionally additional such exchanges (maximum of 32,767 microseconds). When the sender sends a request to send (RTS) the receiver waits one short interframe space (SIFS) before sending CTS. The sender will wait again an SIFS before sending a data-bearing or management frame. Again the receiver will wait a SIFS before sending an ACK or block ACK or no response. NAV is the duration from the first SIFS to the ending of ACK or block ACK in some embodiments. Additional such exchanges may occur within SIFS of the end of the ACK or block ACK. During this time the medium is considered busy. SIFS may refer to the amount of time in microseconds required for a wireless interface to process a received frame and to initiate a response transmission with a response frame in some embodiments.

The second non-primary channel utilization operation uses a common understanding between the transmitting device 404 and receiving device 408 of the primary 20 MHz channel being occupied by OBSS and of any other channels being not available. In some embodiments, the transmitting and receiving device 408*s* attempt to detect the same OBSS on the primary 20 MHz channel and then move to the next set of channels. The signal strength from the OBSS is compared to a threshold to detect the OBSS. In some embodiments, the threshold is set to increase the probability that both transmitting device 404 and receiving device 408 detect the OBSS. In some embodiments, the threshold is set to less than −62 dBm or −72 dBm. Similarly, other channels can be determined to be busy or idle by comparing signal strength on the channel to a threshold (e.g., greater than or less than −62 dBm (or −72 dBm), respectively) in some embodiments. In some embodiments, the transmitting device 404 and/or receiving device 408*s* detect an OBSS or other busy activity by detecting if there is an indication transmitted through a control link. If a control link exists, and an indication is transmitted on the control link to switch to another channel, the transmitting device 404 moves to another channel in the set of channels. In some embodiments, the transmitting device 404 and/or receiving device 408*s* detect an OBSS or other busy activity in response to identification information within the preamble and/or MAC portion of a frame. In some embodiments, this detection scheme is used in a coordinated system.

Figure 5:
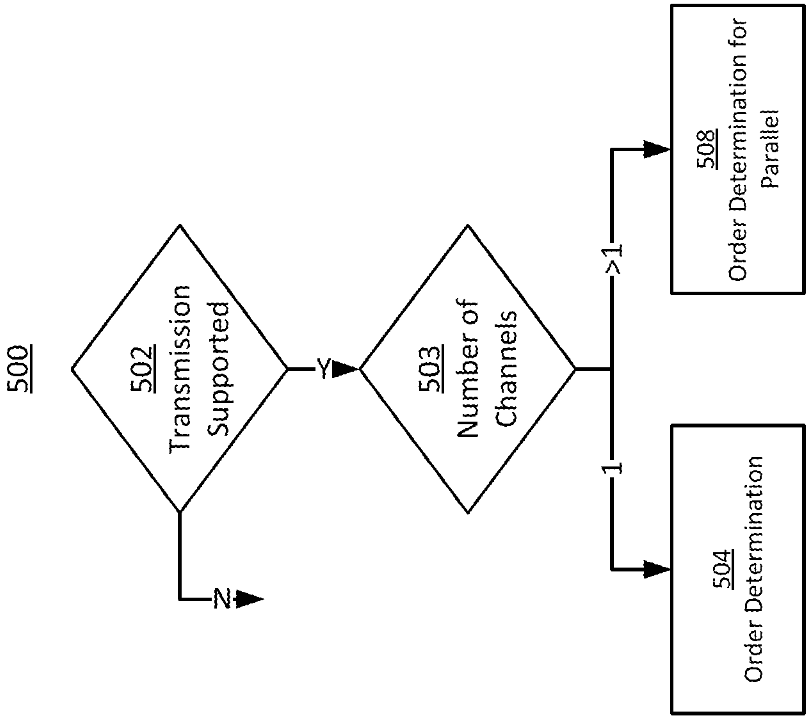
FIG. 5 is a flow diagram illustrating an example transmitting device operation for non-primary channel utilization setup operations for the network illustrated in FIG. 2A, according to some embodiments.

With reference to FIG. 5, a flow 500 can be performed in system 200 for a transmitting device non-primary channel utilization setup operation in some embodiments. Flow 500 is for a transmitting device and includes an operation 502. At operation 502, the transmitting device determines if non-primary channel transmission is supported. If not, flow 500 ends. If so, the transmitting device advances to an operation 503.

At operation 503, the transmitting device determines the number of channels (e.g., 1, 2, 3, 4, 8, etc.) that can support CCA operations in some embodiments. If the transmitting device can only support one channel for CCA operations, the transmitting device determines the order in which CCA operations are supported on the channels in operation 504 in some embodiments. If the transmitting device can support more than one channel for CCA operations, the transmitting device determines channels for supporting CCA operations in parallel in operation 508 in some embodiments. If all channels do not support CCA operations, an order in which CCA operations are supported on multiple sets of channels is determined in operation 508 in some embodiments.

Figure 6:
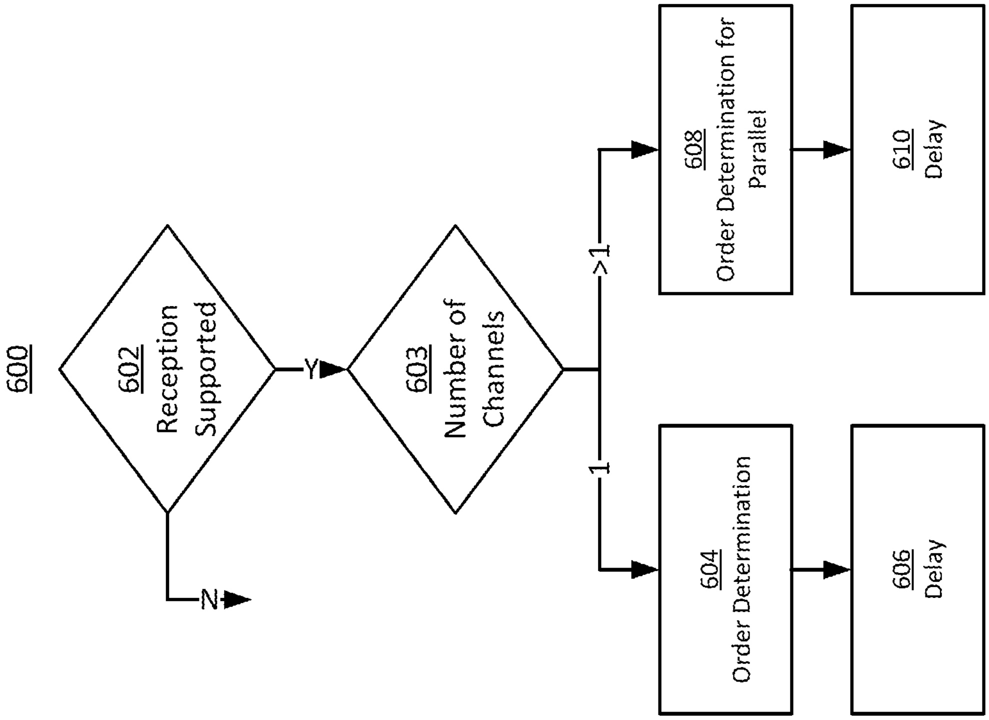
FIG. 6 is a flow diagram illustrating an example receiving device operation for non-primary channel utilization setup operations for the network illustrated in FIG. 2A, according to some embodiments.

With reference to FIG. 6, a flow 600 can be performed in system 200 for a receiving device non-primary channel utilization setup operation in some embodiments. Flow 600 is for a receiving device and includes an operation 602. At operation 602, the receiving device determines if non-primary channel reception is supported. If not, flow 600 ends. If so, the receiving device advances to an operation 603.

At operation 603, receiving device determines the number of channels (e.g., 1, 2, 3, 4, 8, etc.) that can support preamble decode operations in parallel in some embodiments. If the receiving device can only support one channel for CCA operations, the receiving device determines the order in which preamble decode operations are supported on the channels in operation 604. A delay required for moving from one channel to the next (e.g., the SameSetDelay parameter) can be determined in operation 606. If the receiving device can support more than one channel for preamble decode operations, the receiving device determines channels for preamble decode operations in parallel in operation 608 in some embodiments. If all channels do not support preamble decode operations, an order in which preamble decode operations are supported on multiple sets of channels is determined in operation 608 in some embodiments. In some embodiments, in operation 608, even if multiple channels support preamble decode in parallel, the receiving device determines whether simultaneous preamble decode is supported on the multiple channels. If not, the delay required to come out of a preamble decode on one channel corresponding to a not-to-self packet is determined in an operation 610 in some embodiments. Delays can be determined based upon device parameters in some embodiments.

In some embodiments, the capability negotiation in flows 600 and 600 allow the transmitting device and the receiving device to determine, negotiate and/or agree on a number of parameters for non-primary channel utilization operations. For example, parameters can include an indication whether or not to exercise non-primary channel exchange, a parallel/sequential order in which non-primary channel exchange is performed, a time gap (e.g., SameSetDelay parameter) parameter needed at the receiving device between preambles on two different channels of the same set in order to successfully decode the preambles, a time gap needed at the receiving device between preambles on two channels of two different sets in order to successfully decode the preambles (e.g., OtherSetDelay parameter), etc.

Examples of parallel/sequential order in which non-primary channel exchange is performed include Set 1: channels 1, k+1, 2k+1, (TR1); Set 2: channels 2, k+2, 2k+2, (TR2); etc. Examples of SameSetDelay parameters include 0 microseconds (us), 50 us, 100 us, 200 us etc. Examples of OtherSetDelay parameters include 0 us, 50 us, 100 us, 200 us etc.

In some embodiments, during transmit on one channel, blindness on all other channels is assumed. During receive on one channel, blindness on any other channels is determined. If blindness on a channel is not aligned with a known virtual current sense (NAV), a medium synchronization process is used. A synchronization process timer is initiated when the blindness ends at the end of the transmission or reception, with a timer duration set for conservative behavior upon returning from the channel. A lower energy detect (ED) threshold value can be used in some embodiments to make the returning device more sensitive to detecting an ongoing transmission while the timer is running.

Transmitting on any subset of channels of a link renders the transmitting device blind on the channels that are left out from the perspective of preamble detection. Anytime that a transmitting device is blind on a set of channels for the purpose of the CCA operation, the transmitting device performs conservative access measures on returning to it so as not to penalize the already transmitting devices in some embodiments. In some embodiments, anytime that a transmitting device is blind on a set of channels for a CCA operation, the transmitting device performs conservative access measures on returning to the set for channels so that other transmitting devices are not penalized.

In some embodiments, a number of implementations of flows 500 and 600 can operate simultaneously in communication system 200. Flows 500 and 600 can be performed in firmware executing on the hardware of STAs 202, 204, 206, and 208 and APs 212, 214, and 216. The firmware can operate in a layer of a protocol stack or the MAC layer of STAs 202, 204, and 206 and/or APs 212, 214, and 216.

In some embodiments, STAs 202, 204, 206, and 208 and/or APs 212, 214, and 216 can employ a control link technique to communicate low latency data or control data. The device that obtains (e.g., wins) access to the control channel/link can send frame addressing to other coordinated devices and assign the other coordinated devices opportunities to transmit. The frame is a special trigger frame in some embodiments. The special trigger frame may refer to a frame that provides the assignment and can allocate times, sub-bands, and other parameters in some embodiments. The allocation can be both with time and resource unit (RU) granularity and be in narrowband such as one 26-tone RU width. A 26-tone RU width can correspond to a 2 MHz bandwidth (e.g., less than 2.1 MHz) in some embodiments. An RU can be a group of 78.125 kHz bandwidth subcarriers (tones) in a channel bandwidth used in both DownLink (DL) and UpLink (UL) transmissions. With orthogonal frequency division multiplexing access (OFDMA), different transmit powers may be applied to different RUs. A tone bandwidth or tone may refer to a portion of an electromagnetic spectrum (e.g., usually smaller than a primary channel) in some embodiments.

Figure 7:
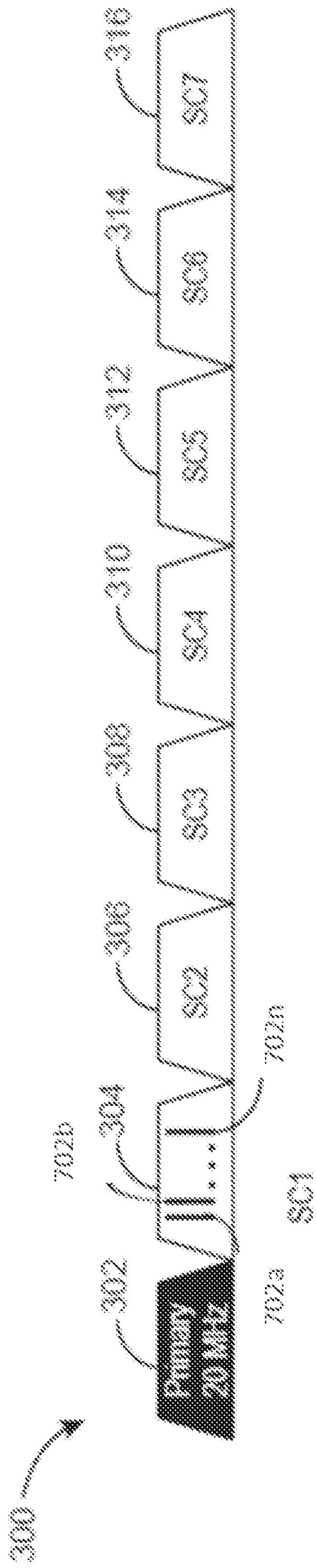
FIG. 7 is a block diagram of resources for use in the network illustrated in FIG. 2A, according to some embodiments.

With reference to FIG. 7, a resource can be one or more of groups 702*a*, 702*b*, . . . 702*n* of subcarriers or bandwidths. In some embodiments, groups 702*a*, 702*b*, . . . 702*n* are part of any of primary channel 302 or secondary channels 304-316. Each sub carrier in groups 702*a*, 702*b*, . . . 702*n* has a 78.125 kHz bandwidth in some embodiments. Each of groups 702*a*, 702*b*, 702*n* can have any number of subcarriers from 1 to N where N is any number (e.g., 1, 5, 8, 25, 26, 32, 50, 64, 72, 78, 100, 200, etc.) In some embodiments, the subcarriers are contiguous in each of groups 702*a*, 702*b*, . . . 702*n*.

In some embodiments, a dedicated resource (e.g., a dedicated subcarrier or group of subcarriers (groups 702*a*, 702*b*, . . . 702*n*)) can be semi-persistently allocated to APs and non-AP devices (STAs 202, 204, 206, and 208 and/or APs 212, 214, and 216). In some embodiments, a semi-persistent schedule allows each device to have a real time allocation to transmit periodically on the resource (e.g., every 5 milliseconds or 10 milliseconds). In some embodiments, the schedule may also assign a frequency allocation for each device. In some embodiments, the use of a resource or resources is coordinated among different devices or OBSS. For example, time schedules and or frequency levels can be used to ensure that any device which has to transmit a latency sensitive or control packet receives access with the smaller delay compared to conventional 802.11 priority schemes. Multiple narrowband resources (e.g., 78.125 kHz or less than 80 KHz) bandwidth subcarriers can be allocated to increase diversity (e.g., if needed). The frequency bands, bandwidth, the number of resources and tone-widths discussed above are exemplary. Other frequency bands, bandwidth, the number of resources and tone-widths can be utilized. In some embodiments, the resource has a narrower bandwidth than a primary channel and is dedicated exclusively for exchange of certain information (e.g., time critical information, low latency information, control information, non-primary channel utilization information, resource sharing information, and resource scheduling information, etc.). In some embodiments, smaller resource bandwidths can be used with different defined subcarrier spacings (e.g. in an scalable fashion). In some embodiments, wider resources and multiple such resources can be used (either to carry more volume of critical information or for diversity (example through repetition).

The resources can be allocated within the TXOP of an AP or a non-AP devices. In some embodiments, time and frequency multiplexing is used to communicate control or latency-sensitive data to/from multiple non-APs. Time multiplexing may refer to the assigning of a certain number of symbols to each addressed device in time sequence in some embodiments. Frequency multiplexing may refer to the assigning of a certain number of tones to each addressed device in a specific time slot of a few OFDMA symbols in some embodiments. A parameter for time multiplexing may refer to one or more parameters that are used to assign symbols in a time sequence in some embodiments. A parameter for frequency multiplexing may refer to one or more parameters that are used to assign tones in some embodiments.

In some embodiments, a resource or resources (e.g., one or more of groups 702*a*, 702*b*, . . . 702*n*) are shared via random access or multiplexing through orthogonal or quasi orthogonal codes. Random access may refer to a protocol where each addressed device has a random chance of securing an opportunity to transmit in the allocated resource. The protocol is similar to a UL OFDMA-based Random Access (UORA) in some embodiments. In some embodiments, a special contention window parameter or parameters is assigned to each device indicating its chance to be able to transmit randomly on the allocated resource. Orthogonal codes may refer to codes where a first symbol does not interfere with a second symbol in some embodiments. A quasi-orthogonal codes may refer to codes with relaxed orthogonality requirements in some embodiments.

In some embodiments, STAs 202, 204, 206, and 208 and/or APs 212, 214, and 216 can be configured to use a resource (e.g., one or more of groups 702*a*, 702*b*, . . . 702*n*) to carry scheduling information for other resources (that are not a part of the dedicated resource for critical information). In some embodiments, a certain portion of the dedicated resource (e.g., a particular time period) of the dedicated resource (e.g., the control resource) carries scheduling information for the remainder of the control resource and another portion of the dedicated resource carries scheduling information for a resource that is outside of the dedicated resource.

In some embodiments, opportunities are allocated by starting transmissions in a staggered manner where the highest priority of transmission has the least stagger. Once the first device starts transmitting, the other devices are automatically silenced.

In some embodiments, physical layer orthogonal codes are assigned to the transmissions of the devices (when the transmissions are very short, e.g., a few bits) which can enable the individual transmissions to be discerned even if they are transmitted in the same resource. In some embodiments, quasi orthogonal or orthogonal codes are used (e.g., noise codes or Walsh codes). In some embodiments, one device only transmits minus one or plus one (real) and the other device transmits only minus i or plus i.

In some embodiments, the resources can be shared across basic service sets (BSSs) via inter-BSS coordination so as to reduce contention/collision for transmission within such resources. For example, a controller BSS within a network of BSSs can control the usage of the shared resources indicating to each BSS how it must share the resources and how it may use the shared resources. The controller BSS gets information from each of the participating BSSs regarding its resource requirements/characteristics for control and short-low-latency traffic ins some embodiments. In the time allocated by the controller BSS, the devices can indicate/share control information with other devices. Some examples of control information include but are not limited to: occupancy by others using EDCA of the primary 20 MHz channel, occupancy of the enhanced multilink single radio (EMLSR) primary link by an overlapping BSS (OBSS) in the case of an EMLSR AP/mobile AP, spatial reuse coordination information, and/or coordination information for distributed/non-collocated APs of a multilink AP device (AP MLD) for use in multi-AP coordination techniques.

In some embodiments, the devices transmit latency-sensitive short packets and/or transmit control protocol acknowledges (TCP-ACKs) via the resources. In some embodiments, the channel or resource is in a 2.4G band/link. The 2.4 GHz band/link is used for transmit latency-sensitive short packets and/or transmit control protocol acknowledges (TCP-ACKs) in some embodiments. In some embodiments, using resources in the 2.4 GHZ band as a simultaneous transmit receive (STR) control link allows control messages and short high priority packets to be transmitted irrespective of the activity on the 5G/6G link.

In some embodiments, the transmissions can use lower throughput modulation coding scheme (MCS) with higher reliability, lower path loss and lower bandwidth (hence, higher power spectral density (PSD)). Use of a 2.4 GHZ control channel in parallel with data channels in 5 GHz/6 GHZ links provides significant advantages as the control channel coverage becomes larger or much higher than the data channels. The transmissions in the 2.4 GHz control channel can occur irrespective of transmit/receive status of the 5 GHz/6 GHz channels (e.g., the 2.4 GHz control channel or resource can be used even though the 5G or 6G link is busy). In some embodiments, the 2.4 GHz band or link is dedicated for the transmission of control or latency-sensitive data. Transmit/receive operations for any other data can use other 802.11 bands where higher bandwidths are available in some embodiments.

It should be noted that certain passages of this disclosure can reference terms such as “first” and “second” in connection with subsets of frames, response, and devices, for purposes of identifying or differentiating one from another or from others. These terms are not intended to relate entities (e.g., a first device and a second device) temporally or according to a sequence, although in some cases, these entities can include such a relationship. Nor do these terms limit the number of possible entities (e.g., STAs, APs, beam formers and/or beam formees) that can operate within a system or environment. It should be understood that the systems described above can provide multiple ones of any or each of those components and these components can be provided on either a standalone machine or, in some embodiments, on multiple machines in a distributed system. Further still, bit field positions can be changed and multibit words can be used. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C#, or in any byte code language such as JAVA. The software programs or executable instructions can be stored on or in one or more articles of manufacture as object code. Circuitry may refer to any electronic circuits or circuits.

While the foregoing written description of the methods and systems enables one of ordinary skill to make and use embodiments thereof, those of ordinary skill will understand and appreciate the existence of variations, combinations, and equivalents of the specific embodiment, method, and examples herein. For example, specific values for bandwidths, channels and sub bands discussed above are exemplary. The present methods and systems should therefore not be limited by the above described embodiments, methods, and examples, but by all embodiments and methods within the scope and spirit of the disclosure.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A first device for communicating with a second device, the first device comprising:

circuitry configured to:

determine that a primary channel for communication with the second device is not available during a period;

during the period, communicate data to the second device using a first resource disposed within a bandwidth of the primary channel, wherein the first resource has a bandwidth of less than the bandwidth of the primary channel of a plurality of links, and wherein the data is low latency data or control data;

communicate with the second device using a second resource after a first predefined delay from using the first resource, wherein the first predefined delay is a delay between resources of a same set; and communicate with the second device using a third resource after a second predefined delay from using the second resource, wherein the second predefined delay is a delay between resources of different sets.

2. The first device of claim 1, wherein the circuitry is further configured to communicate a frame assigning an opportunity to other devices to transmit on the first resource wherein the bandwidth of the first resource is less than 2.1 MHz in a 2.4 GHz link, a 5 GHz link, or a 6 GHz link.

3. The first device of claim 2, wherein the first device comprises an access point device communicating via the 802.11be protocol and the first resource is an anchor channel communicated between a plurality of devices of a same basic service set (BSS) to monitor simultaneously to the primary channel.

4. The first device of claim 1, wherein the first resource is a twenty-six tone bandwidth and each tone has a bandwidth of less than 80 kilohertz wide.

5. The first device of claim 2, wherein the data is augmented reality data, virtual reality data, packets for video conferencing, or voice packets.

6. The first device of claim 2, wherein the frame provides time division multiplexing parameters for the first resource.

7. The first device of claim 2, wherein the frame provides frequency division multiplexing parameters for the first resource.

8. The first device of claim 2, wherein the data comprises occupancy of the primary channel, occupancy of an enhanced multilink single radio (EMLSR) primary link, or spatial reuse coordination information.

9. The first device of claim 2, wherein the first resource is within the 2.4 GHz link.

10. The first device of claim 2, wherein the circuitry is further configured to communicate a frame assigning an opportunity to other devices to transmit on a set of resources each having a bandwidth of less than 2.1 MHz.

11. The first device of claim 1, wherein the data is for non-primary channel utilization.

12. A first device for communicating on a network, the first device comprising:

circuitry configured to:

communicate with a second device using a primary channel during a first period;

access a first resource disposed within a bandwidth of the primary channel during the first period, wherein the first resource has a bandwidth of less than a bandwidth of the primary channel of a plurality of links;

send a packet to one or more other devices to allocate opportunities to transmit a short packet on the first resource to the one or more other devices based on an availability of the primary channel during the first period;

determine that the primary channel for communication with the second device is not available during a second period;

during the second period, communicate data to the second device using the first resource disposed within the bandwidth of the primary channel, and wherein the data is low latency data or control data;

communicate with the second device using a second resource after a first predefined delay from using the first resource, wherein the first predefined delay is a delay between resources of a same set; and communicate with the second device using a third resource after a second predefined delay from using the second resource, wherein the second predefined delay is a delay between resources of different sets.

13. The first device of claim 12, wherein the first device comprises a station (STA) device communicating via the 802.11be protocol, and the bandwidth of the first resource is less than 2.1 MHz in a 2.4 GHz link, a 5 GHz link, or a 6 GHz link.

14. The first device of claim 12, wherein the first resource comprises a twenty-six tone bandwidth.

15. The first device of claim 14, wherein a tone of the twenty-six tone bandwidth has a 78.125 kilohertz wide bandwidth.

16. The first device of claim 12, wherein the short packet comprises augmented reality data, virtual reality data, a packet for video conferencing, or a voice packet.

17. A method of communicating data with a second device, the method comprising:

determining that a primary channel for communication with the second device is not available during a period;

during the period, communicating data to the second device using a first resource disposed within a bandwidth of the primary channel, wherein the first resource has a bandwidth of less the bandwidth of the primary channel of a plurality of links, and wherein the data is low latency data or control data;

communicating with the second device using a second resource after a first predefined delay from using the first resource, wherein the first predefined delay is a delay between resources of a same set; and communicating with the second device using a third resource after a second predefined delay from using the second resource, wherein the second predefined delay is a delay between resources of different sets.

18. The method of claim 17, wherein the data is latency sensitive data or control data.

19. The method of claim 17, wherein the data comprises a short packet comprising occupancy information for a 20 MHz primary channel, wherein the bandwidth of the first resource is less than 2.1 MHz in a 2.4 GHz link, a 5 GHz link, or a 6 GHz link.

* * * * *